US010378858B2

(12) United States Patent
Gull

(10) Patent No.: US 10,378,858 B2
(45) Date of Patent: Aug. 13, 2019

(54) SYSTEMS, DEVICES AND METHODS FOR VISUALIZING A TARGET

(71) Applicant: Kai W. Gull, Logan, UT (US)

(72) Inventor: Kai W. Gull, Logan, UT (US)

( * ) Notice: Subject to any disclaimer, the term of this patent is extended or adjusted under 35 U.S.C. 154(b) by 177 days.

(21) Appl. No.: 15/411,547

(22) Filed: Jan. 20, 2017

(65) Prior Publication Data

US 2017/0328677 A1   Nov. 16, 2017

Related U.S. Application Data

(60) Provisional application No. 62/281,273, filed on Jan. 21, 2016.

(51) Int. Cl.
| | |
|---|---|
| *F41G 3/16* | (2006.01) |
| *H04N 7/18* | (2006.01) |
| *F41G 11/00* | (2006.01) |
| *F41G 1/32* | (2006.01) |
| *G02B 27/01* | (2006.01) |
| *F41G 3/02* | (2006.01) |

(52) U.S. Cl.
CPC .............. *F41G 3/165* (2013.01); *F41G 1/32* (2013.01); *F41G 11/00* (2013.01); *G02B 27/0176* (2013.01); *G02B 27/0179* (2013.01); *G02B 27/0189* (2013.01); *H04N 7/185* (2013.01); *F41G 3/02* (2013.01); *G02B 2027/0143* (2013.01); *G02B 2027/0156* (2013.01)

(58) Field of Classification Search
CPC ... F41G 11/00; F41G 1/32; F41G 3/02; F41G 3/165; G02B 2027/0143; G02B 2027/0156; G02B 27/0176; G02B 27/0179; G02B 27/0189; H04N 7/185
See application file for complete search history.

(56) References Cited

U.S. PATENT DOCUMENTS

| | | | | |
|---|---|---|---|---|
| 4,570,530 | A * | 2/1986 | Armstrong | F41G 3/22 348/143 |
| 4,786,966 | A * | 11/1988 | Hanson | F41G 3/165 224/181 |
| 5,834,676 | A * | 11/1998 | Elliott | F41G 3/165 89/41.05 |
| 6,070,355 | A * | 6/2000 | Day | F41C 27/00 42/106 |
| 8,297,173 | B1 * | 10/2012 | Teetzel | F41G 3/165 42/111 |
| 8,587,711 | B2 * | 11/2013 | Anderson | H04N 5/23293 348/333.01 |
| 8,707,601 | B1 * | 4/2014 | Kirk | F41C 27/00 340/4.2 |
| 2002/0157296 | A1 * | 10/2002 | Vivian | F41A 17/066 42/70.11 |

(Continued)

OTHER PUBLICATIONS

U.S. Appl. No. 62/281,273, filed Jan. 21, 2016, Gull.

(Continued)

*Primary Examiner* — Peter D Le
(74) *Attorney, Agent, or Firm* — Workman Nydegger

(57) ABSTRACT

A targeting system for visualizing a target includes a targeting assembly having a main body mountable to a weapon and a rail-locking member selectively mountable to the main body. The main body supports at least one of a visual assembly, a power assembly, and a transmission assembly. Communicating with the targeting assembly is a viewing assembly.

19 Claims, 18 Drawing Sheets

(56) References Cited

U.S. PATENT DOCUMENTS

| | | | |
|---|---|---|---|
| 2006/0196098 A1* | 9/2006 | Lee | F41G 1/38 42/123 |
| 2007/0028501 A1* | 2/2007 | Fressola | F41H 13/0025 42/146 |
| 2008/0060248 A1* | 3/2008 | Pine | F41G 1/35 42/114 |
| 2008/0186586 A1* | 8/2008 | Yamamoto | G02B 27/0176 359/630 |
| 2008/0204361 A1* | 8/2008 | Scales | F41G 3/165 345/8 |
| 2009/0227372 A1* | 9/2009 | Yang | F41G 3/145 463/36 |
| 2009/0320348 A1* | 12/2009 | Kelly | F41G 1/38 42/119 |
| 2011/0035984 A1* | 2/2011 | Liu | F41C 27/00 42/111 |
| 2012/0010749 A1* | 1/2012 | van der Merw | A61F 2/54 700/264 |
| 2012/0233901 A1* | 9/2012 | Kim | F41A 21/06 42/84 |
| 2013/0133510 A1* | 5/2013 | Piazza | F41G 3/165 89/41.05 |
| 2014/0251123 A1* | 9/2014 | Venema | F41G 3/16 89/41.22 |
| 2016/0165192 A1* | 6/2016 | Saatchi | H04N 5/772 386/227 |
| 2016/0290766 A1* | 10/2016 | Williams | F41A 35/00 |
| 2017/0034405 A1* | 2/2017 | Ryniec | H04N 5/2251 |
| 2017/0059871 A1* | 3/2017 | Hashiba | G02B 27/0179 |
| 2017/0075145 A1* | 3/2017 | Armstrong | G02C 7/14 |

OTHER PUBLICATIONS

Accutact, https://www.military.com/kitup/2012/02/a-poor-mans-corner-shot.html, accessed on Jan. 5, 2018.

BEA Systems Army, Vergun, David, "New night vision gear allows Soldiers to accurately Shoot from hip", Jul. 22, 2015, https://www.army.mil/article/152691/new_night_vision_gear_allows_Soldiers_to_accurately_shoot_from_hip/, accessed on Jan. 4, 2018.

BEA Systems Marines, South, Todd, "New night vision means soldiers can shoot around corners", Jul. 28, 2017, https://www.marinecorpstimes.com/news/your-army/2017/07/29/new-night-vision-means-soldiers-can-shoot-around-corners/, accessed on Jan. 4, 2018.

Corner Shot, http://cornershot.com/index.php, accessed on Jan. 4, 2018.

Digital Crosshairs, https://www.digitalcrosshairs.net, accessed on Jan. 2, 2018.

Dyer, Nicole, "Invention Awards: A Video Gun Sight That Keeps Soldiers Out of Danger", Popular Science, May 24, 2010, https://www.popsci.com/diy/article/2010-05/invention-awards-soldiers-third-eye, accessed on Jan. 4, 2018.

Mizokami, Kyle, "New Wireless Sights Show U.S. Soldiers Exactly Where Their Machine Gun Fire Will Hit: New tech will let soldiers shoot machine guns via helmet mounted displays"—FWS-CS, Dec. 9, 2016, http://www.popularmechanics.com/military/weapons/a24234/the-armys-heavy-weapons-are-going-wireless/, accessed on Jan. 5, 2018.

"New Wearable Night Vision Rifle Targeting Glasses Released", https://www.pr.com/press-release/620837, accessed on Jan. 4, 2018.

Smith, Mat, "Recon's HUD mask transfers your gaming skills to paintball", https://www.engadget.com/2016/01/07/recons-hud-mask-empire-paintball/#/, accessed on Jan. 2, 2018.

SmartSight, http://www.smartsight-usa.com/, accessed on Jan. 5, 2018.

Tracking Point, https://www.tracking-point.com/shotglass/, accessed on Jan. 4, 2018.

"Wearable Night Vision Scope"—video, https://www.youtube.com/watch?v=29zF7Q2C-4A, published on Nov. 26, 2015, accessed on Jan. 2, 2018.

* cited by examiner

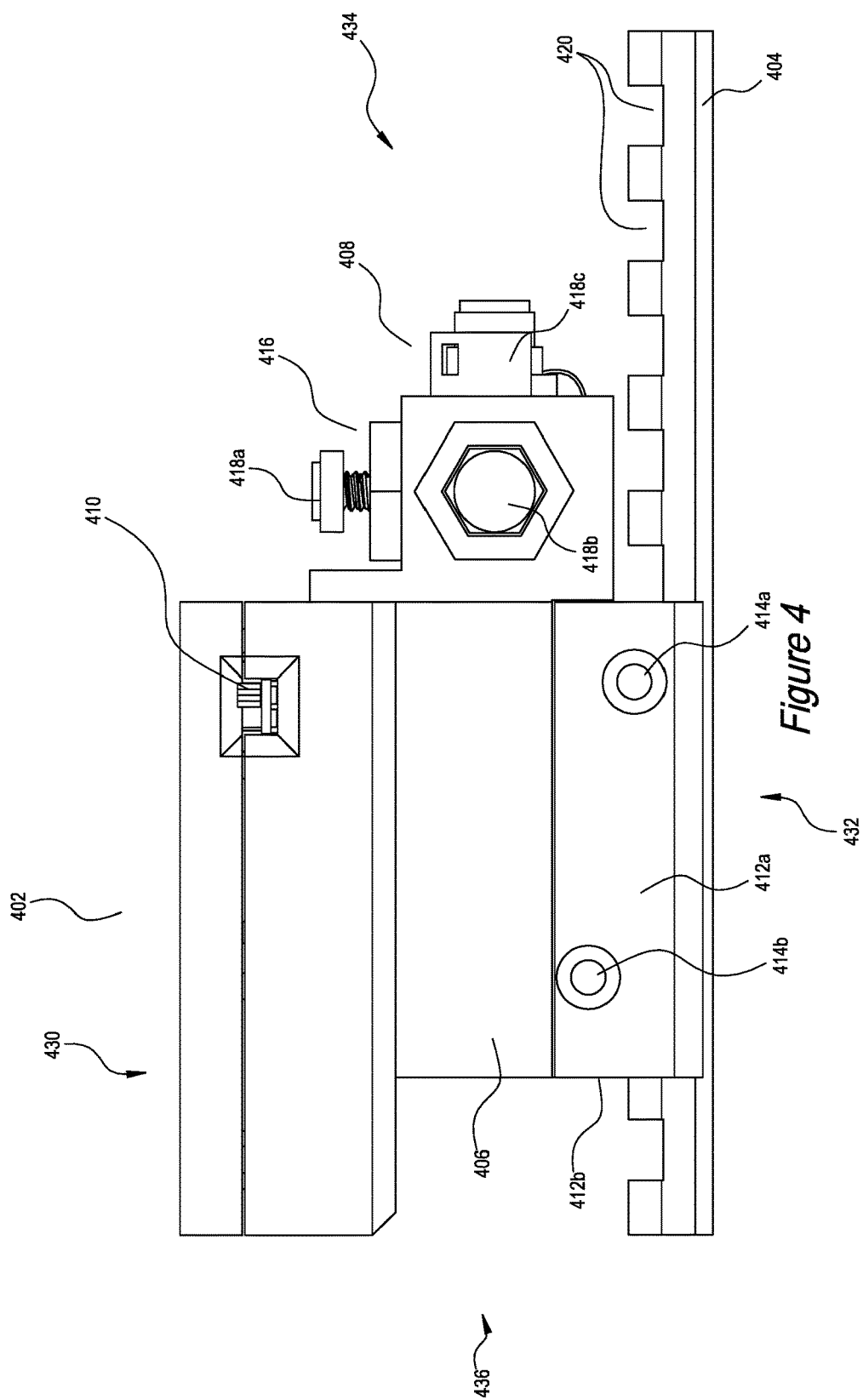

SYSTEMS, DEVICES AND METHODS FOR VISUALIZING A TARGET

CROSS-REFERENCE TO RELATED APPLICATIONS

This application claims the benefit of U.S. Provisional Application Ser. No. 62/281,273, filed Jan. 21, 2016, which is incorporated herein by reference in its entirety.

BACKGROUND OF THE INVENTION

1. The Field of the Invention

The present invention generally relates to systems, devices, and methods for visualizing a target and presenting such information to a user/operator of the systems, devices, and methods.

2. The Relevant Technology

Presently, there are a number of systems that enhance a user's ability to target a firearm utilizing video cameras and displays. One such system utilizes a scope with an embedded computing device that can correct for many variables that determine an accurate shot. A user can mark a target within the scope's field of view and then engage the trigger. The system then manipulates the characteristics of the firearm to account for the series of variables and then causes the gun to make the shot based on those calculated modifications. However, this system requires a very significant mechanical integration between the sighting mechanism and the firearm itself.

Other systems utilize an external screen that attaches to a riflescope for viewing. In such systems, a video camera is mounted on the distal end of an existing riflescope that sends captured video along a hardwired cable to a screen located at the proximal end of the scope or in another location. These systems are only compatible with certain scopes. In systems requiring a detached external screen, a user must alternate between his normal field of view and looking at the screen.

Finally, other systems have been developed that enable a semi-automatic firearm or grenade launcher to fold and shoot around corners. These systems included built in cameras that have hardwired connections to a small screen attached to the side of the weapon. This allows a user to view what is around a corner in the attached screen and then accurately fire a shot. However, such systems require a user to look directly at the screen on the gun to see where they are shooting. The process and mechanism that enables the firearm to shoot around corners is also inherently slow and requires specific conditions and lots of time.

BRIEF SUMMARY OF THE INVENTION

To overcome difficulties with existing technologies, one targeting system as described herein is compatible with various weapons having accessory rail-type attachment structures. The targeting systems described herein can be a small weapon attachment that is inexpensive to produce and has a wide compatibility with most firearms.

One targeting system utilizes a small monocular display worn by a user, such as see-through displays, eyeglasses, eye spectacles, or other wearable device. The monocular device is small and lightweight and allows the user to maintain visualization on both the user's normal field of view as well as the field of view corresponding to the direction of the firearm.

Thus, the described targeting systems allow a user to peer around, above, or below corners or other obstructions with virtually any firearm. Additionally, the monocular viewer allows the user to maintain their normal field of view and awareness without having to alternate their gaze to a screen attached directly to the firearm. A user can accurately shoot or check a target position without looking directly at the target or even the firearm itself.

One targeting assembly is configured to be selectively attached to an accessory rail of a suitable device, such as a firearm, toy, drone, or other similar device. The targeting assembly includes a visualization assembly configured to capture video within the field of view corresponding to the direction the device is aimed. Upon collection of video data, the data may be modified to include enhancements, or left in its original state. Once the video has been processed, it is passed to a video transmission component suitable to wirelessly transmit the video data to a suitable receiver.

A receiver assembly is configured to receive transmitted video data from the targeting assembly. Upon receipt, the receiver assembly may modify the video data in the first instance, additionally modify the video data, or pass the video data unmodified to a display assembly by means of a physical video data stream data transmission cable connecting the targeting assembly to the viewing assembly. Additionally, the receiver assembly provides power to the display assembly by means of the same cable or an additional cable.

Video received at the display assembly from the receiver assembly is then displayed to a user on a video display mounted in front of one or both of a user's eyes. The display assembly, in one configuration, is removably mounted to a user's eyeglasses, goggles, or other suitable frame such that the display assembly remains substantially statically in the user's line of sight. The video receiver can be powered by the receiver assembly. Additionally, the display assembly may be adjusted by means of adjuster members in order to customize the location of the display screen to a given user's eye(s).

Depending on the embodiment, the various components include one or more of a transmission or receiving module, on screen display module, batteries, custom printed circuit board, power regulators and channel switches. In some embodiments, sub-assemblies may be combined, while in other embodiments, the components may be in separate units. For example, in some embodiments, only the batteries may be stored in a first unit (perhaps carried in the user's pocket or on the clothing or accessories of the user) while the receiver module, PCB, on/off switch, and channel switch may be in a second unit attached to the user's helmet or some other location. Such split embodiments may be beneficial to allow for user convenience and mobility or to provide batter expansion capabilities.

The on screen display module can be programmed to display a digital cross hair in the center of the monocular display. The sighting in of the digital cross hair can be performed using on the attachment, where there are x-axis and y-axis knobs to adjust the camera lens in conjunction with an opposing biasing member. However, in other configurations the sighting in may be adjusted digitally on the monocular display and not on the attachment assembly, where the digital processing would take place in the battery pack. The custom printed circuit board can be used to mount the electric modules to an exoskeleton in a sound and durable way.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 4 is an illustration of a side view of a targeting assembly portion of a targeting system attached to a compatible firearm accessory rail, according to an embodiment.

DETAILED DESCRIPTION

A targeting system according to the embodiments contained herein, includes several assemblies working in tandem to form a system. Broadly, a targeting system will include a weapon mounted targeting assembly, a user worn viewing assembly, a transmission receiver, and battery pack assembly. Depending on the particular embodiment, these assemblies may be configured differently in order to obtain certain benefits or desirable attributes. In some embodiments these assemblies may be combined into combination sub-units, or some portions of a given assembly may be configured as an additional or alternative assembly. The embodiments that follow generally illustrate some configurations in a manner that will allow better understanding of the purpose of each assembly and subcomponent. However, it should be noted that the following embodiments are non-limiting and other configurations are possible and may be desirable.

Figure 1:
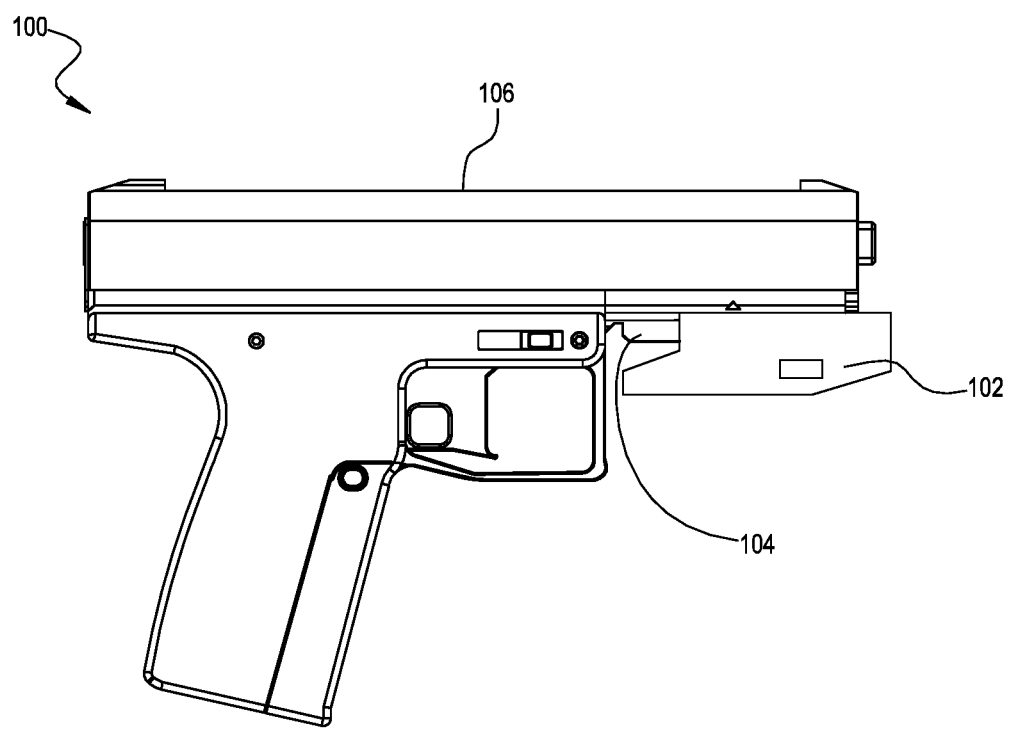
FIG. 1 is an illustration of a targeting assembly portion of a targeting system attached to a compatible firearm, according to an embodiment.
Figure 2A:
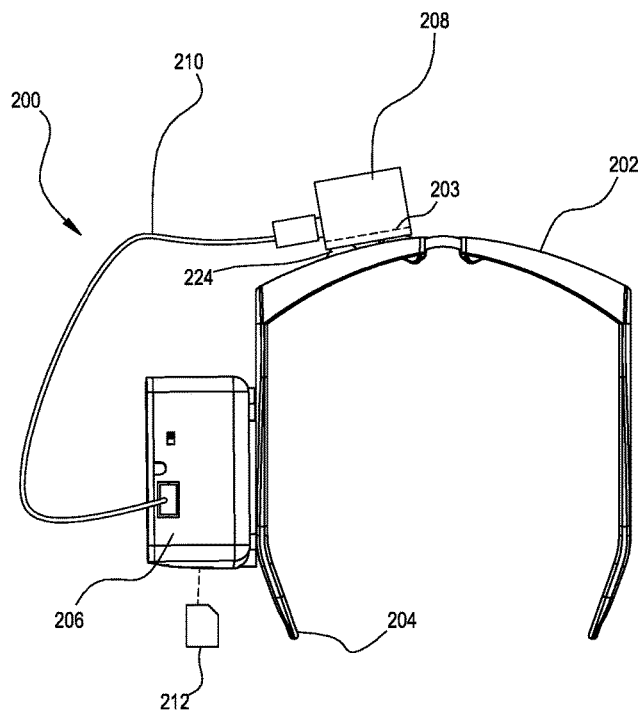
FIGS. 2A and 2B are illustrations of a user monocle and glasses assembly portion of a targeting system as worn by a user of a targeting system, according to an embodiment.

Illustrated in FIG. 1 is a targeting system 100. Targeting system 100 includes a targeting assembly 102 attached to a weapons accessory rail 104 installed on a weapon 106. Illustrated in FIG. 2A is an associated viewing assembly 200 that includes user glasses 202, a user monocle assembly 208 attached to glasses 202, a receiver assembly 206, and a physical cable 210 connecting viewing assembly 200 to receiver assembly 206. Receiver assembly 206 is attached to an arm 204 of user glasses 202.

The targeting system 102 and viewing assembly 200 can communicate with each other via a wired connection or a wireless connection, such as a BLUETOOTH connection or other wireless connection utilizing electromagnetic wave technologies. The targeting assembly 102 mounts to or otherwise cooperates with a weapon 106 having a rail mount or accessory rail 104. For instance, the targeting assembly 102 includes structures complementary to a Picatinny rail, Lever rail, Weaver rail, or other rail-like structure that aid with mounting of various accessories to a weapon. The illustrated configuration depicts the accessory rail 104 provided on a lower portion of the weapon 106, however, those skilled in the art will understand that the accessory rail 104 can be on an upper portion of a weapon's receiver, on a side of a weapon's receiver, or on some other portion of the weapon.

Figure 10:
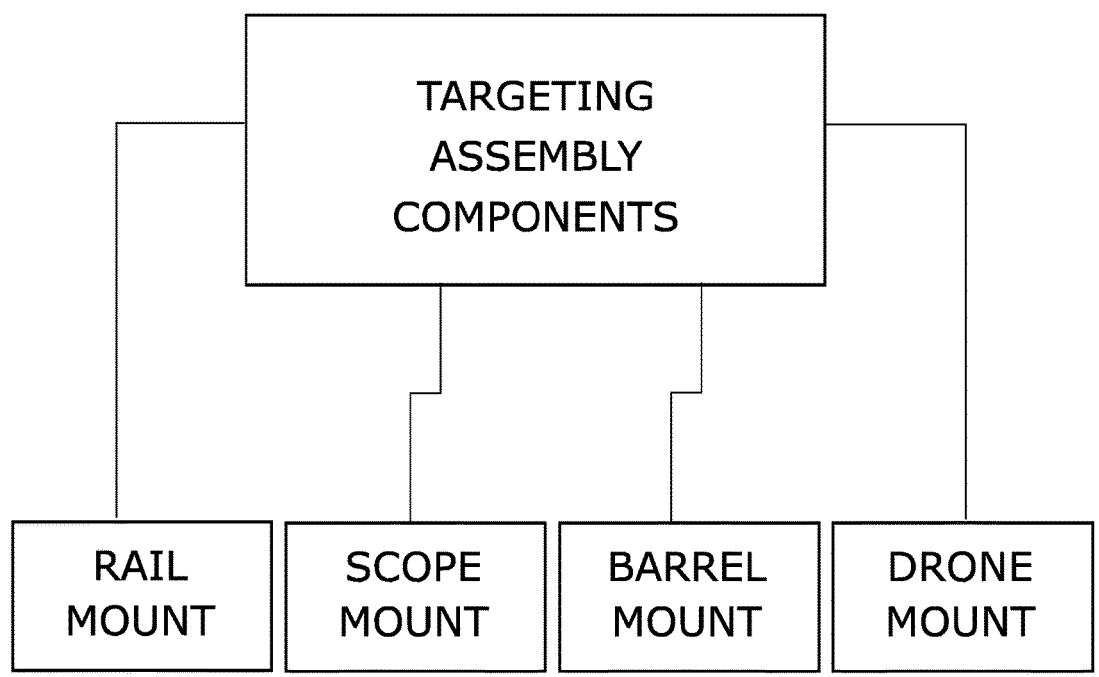
FIG. 10 is a block diagram of several targeting assembly components that enable a targeting assembly to be mounted according to several different mounting configurations.

In addition, other targeting assemblies could be associated with a kit 4000, such as the kit schematically illustrated in FIG. 10 that includes various different mounts to allow use of the targeting assembly with different weapons or structures associated with weapons. For instance, instead of including structures complementary to an accessory rail, the kit could include multiples mounts that allow the components of a target assembly to be mounted to an accessory rail, a scope, and a barrel of a weapon. This allows the targeting assembly to be compatible with all firearms or weapons with an accessory rail, all air soft guns with an accessory rail, all firearms or weapons with a scope, paintball guns, and shot guns. This wide compatibility is what makes the targeting assembly of the present invention to be unique compared to other weapon camera-display systems.

In still another configuration, the previously described kit 4000 could include mounts to allow the components of the targeting assembly to be mounted to a drone, so providing a very compatible and durable first-person view (FPV) solution.

The viewing assembly 208 generally presents images or visual indicia representative of the image or scene viewed by the targeting assembly 102 to an operator of the targeting system 100. For instance, the viewing assembly 208 can present the image or scene to one or both of the operator's eyes using a wearable device or another device selectively attachable and detachable to a wearable device.

A user as is able to manipulate a weapon 106 with an attached targeting assembly 102 to view using viewing assembly 208 any target in the firing direction of the weapon 106 without having to place the weapon 106 near the user's head. For instance, a user could manipulate the weapon 106 and attached targeting assembly 102 to view around an obstruction, such as a wall, while still allowing the user to see targets via viewing assembly 208. This diminishes exposure of the user to potentially dangerous targets and increases the safety of the user.

The targeting system 100 also reduces the amount of time it takes to aim and fire because, once powered on, the user can immediately begin aiming. Such an immediate aiming system provides a significant tactical advantage or home defense environment by allowing a user to safely check around cover when moving into position by exposing only the weapon and targeting system to danger. It also allows a user to attack and defend a position by shooting accurately around cover. A user may also check under doors or overhead before breaching an obstruction.

Figure 2B:
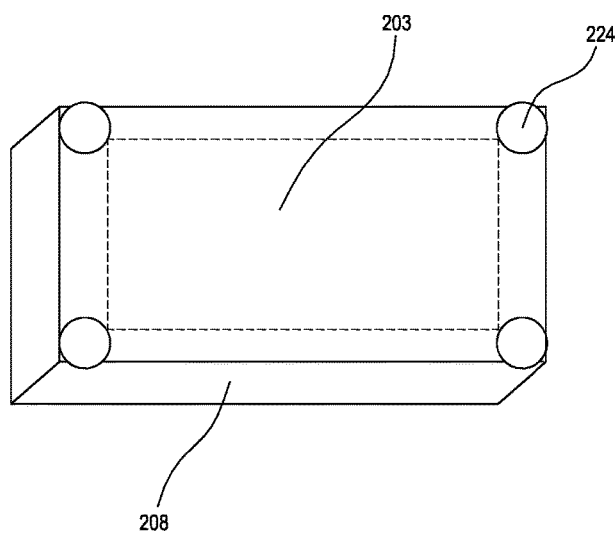

As illustrated in FIG. 2A and FIG. 2B, in addition to the weapons mounted targeting assembly, in one embodiment of the targeting system, a user monocle assembly 200 is included. This monocle assembly 200 enables a user to see the video stream produced by the targeting assembly 102 as shown and described in FIG. 1. By decoupling the video display system from the video capture system, a user has greater ability to acquire targeting information that, if required manually to sight, would be either impossible or dangerous for the user.

The viewing assembly 200 includes a receiver assembly 206 that receives a wireless transmission of video stream data from a targeting assembly mounted on a user's firearm or weapon. In some embodiments, receiver assembly 206 includes a wireless antenna to maintain connection to the targeting assembly 102 using any compatible wireless radio frequency transmission signal, such as BLUETOOTH or 802.11x. In some embodiments, the receiver assembly 206 includes any suitable solid-state video processor microchip capable of processing the received video stream data and converting it into electrical signals appropriate for display on a viewing portal, such as a video display 208 of display assembly 200, as illustrated in FIG. 2A. The converted video stream data is then passed from the video processor microchip to the video display 208 along a physical video transmission cable 210.

In one embodiment, receiver assembly 206 also includes video stream data storage capabilities. As would be known by one skilled in the art, removable video storage 212 allows any video stream data received by receiver assembly 206 to be stored on removable solid-state storage, like flash memory, in addition to being transmitted to the video monitor 203 of video display 208. Such storage medium can be swapped out for higher or lower data capacity based on user preference and from a complementary storage port.

Removable storage functionality allows the targeting system to record video of firearm or weapon activity. For example, a recreational paintball player could record a match or a recreational hunter a trophy hunt. Recording functionality could also serve as an exoneration tool for self-defense or law enforcement applications.

Figure 2C:
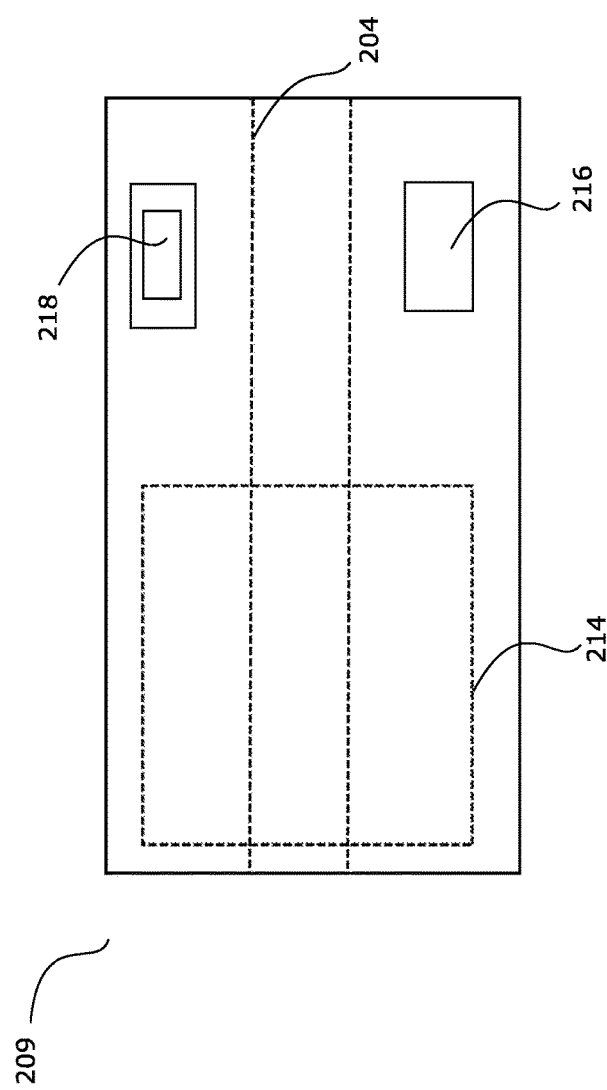
FIG. 2C is an illustration of a user monocle power supply assembly portion of a targeting system, according to an embodiment.

As shown in FIG. 2C, power may be provided to the various assemblies required for user monocle assembly 200 via integrated power assembly 209. Power assembly 209 includes a removable or rechargeable battery 214, charging port 216, and an on/off switch 218. Because the monocle assembly 200 is worn on the face of a user, power cable 210 may be implemented in various lengths or configurations. In one embodiment, power cable 210 is of sufficient length to extend to an auxiliary battery-pack worn or carried by a user in a location other than on the eyeglass assembly 202. This would allow for a physically larger batter pack and subsequently longer battery life. Where portability is preferred over battery life, power cable 210 may be shortened to allow for a battery back to be mounted on an arm 204 of eyeglass assembly 202 or behind the head of the user.

In some embodiments, power assembly 209 is incorporated within the body of receiver assembly 206 while in other embodiments, power assembly 209 may be an additional housing mounted to glasses 202 or elsewhere on the user.

As understood by one skilled in the art, a power assembly 209 would provide electrical power directly to receiver assembly 206. To reduce weight and mitigate any additional interference to the user's field of view caused by additional cables, video transmission cable 210 may also be configured to pass sufficient electrical power to video display 208 in addition to video stream data.

In some embodiments, the power assembly 209 may also include an external charging port 216 and an on/off switch 218. In some embodiments, the charging port 216 is utilized by a user where a rechargeable battery pack is preferred. The charging port may also be configured to allow for charging an included battery 214 either through direct connection to a power grid or though connections like USB or micro-USB and includes internal power regulation circuitry to ensure proper charging characteristics.

In some embodiments, display assembly 208 and receiver assembly 206 (with associated power assembly 209, depending on the configuration) may be removably attached to any user worn eyeglass 202. The receiver assembly 206, with associated power assembly 209, are selectively mounted to an arm portion 204 of the eyeglass 202, directly or by way of an intermediate mounting member, to fixably or removably mount the receiver assembly 206 and associated power assembly 209. For instance, the intermediate mounting member or portions of the receiver assembly 206 and/or power assembly 209 can included recesses that receive the arm portion 204 in at least a partially overlapping manner or can be mounted to a side of the arm portion 204 opposite to the side of the arm portion 204 that would contact a user's head during use. In addition, mounting can be achieved through use of fasteners, adhesives, complementary engaging structures, hook and loop fasteners, or other structures for fixably or removably mounting the receiver assembly 206 and associated power assembly to the eyeglass 202.

Display assembly 208 is removably attached to the lens portion of any user worn eyeglass by way of one or more attachment members. In some embodiments, suction mounting cups 224 may be attached to each corner of the surface of display assembly 208 that faces the user's eye. By applying pressure to the display assembly 208 with one or more suction mounting cups 224 in contact with any suitable eyeglass lens, display assembly 208 can be mounted in a manner that places the video display 203 in the line of site of one eye of the user. The display assembly 208 could, alternatively, be mounted to a portion of the frame surrounding a lens portion of the eyeglass 202, whether fixed or removably mounted thereto, such as through similar manner to which the receiver assembly 206 and/or power assembly are mounted to the eyeglass 202.

Figure 3A:
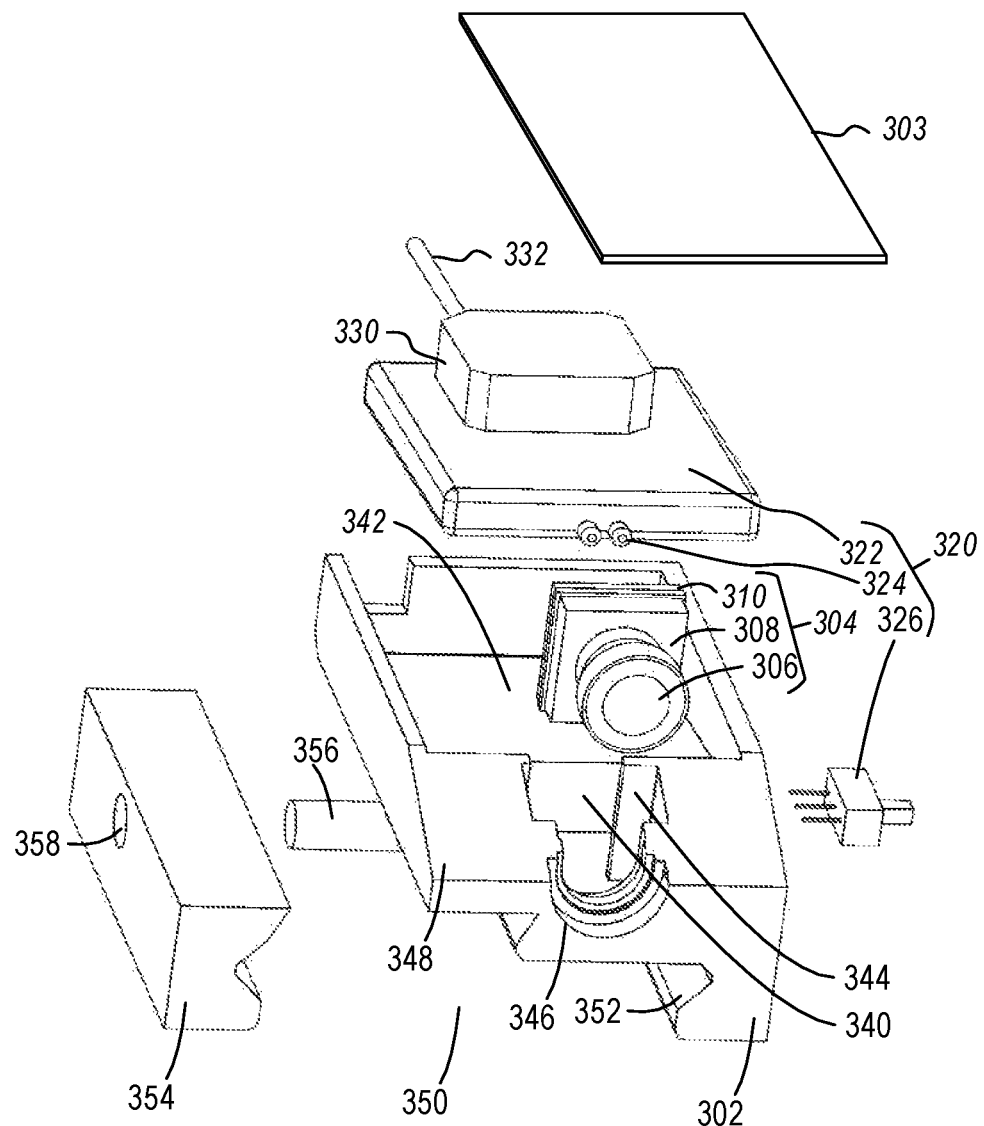
FIG. 3A illustrates various components of a targeting assembly of a targeting system in an unassembled view according to the targeting assembly portion of FIG. 1, according to an embodiment.
Figure 3B:
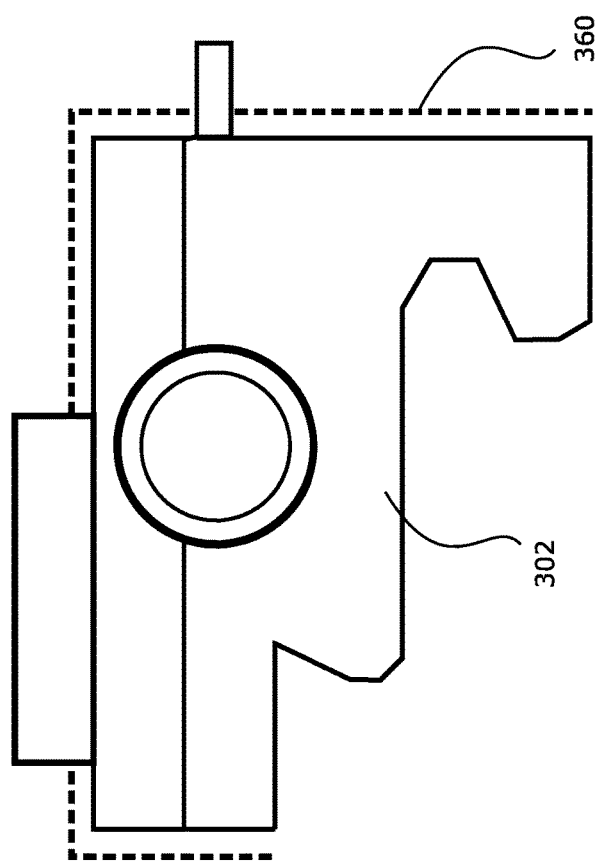
FIG. 3B illustrates a targeting assembly FIG. 1 with an exoskeleton, according to an embodiment.

Turning now to FIG. 3A and FIG. 3B, one embodiment of the targeting assembly 102 as illustrated in FIG. 1 is shown in greater detail. FIG. 3A illustrates targeting assembly 300 that includes several subassemblies including a main body 302, with a cover 303, a visual assembly 304, a power assembly 320, and a video transmission assembly 330. Visual assembly 304 further includes an objective lens and shutter assembly 306, at least one solid-state electronic image sensor 308, such as a CCD image sensor, and any compatible solid-state video image processing microchip 310 known in the art.

The visual assembly 304 is placed at the front of the main body 302 with the objective lens 306 passing through an exterior of the main body 302 so that it can acquire a field of view corresponding to the direction that the main body 302 is oriented. The exterior of the main body 302 through which the housing of the objective lens 306 passes can be considered a front facing portion 348 of the main body 302 which corresponds to the portion of the main body 302 which faces the direction that a user would point or aim the firearm or weapon on which the targeting assembly 300 is installed.

The subcomponents of the visual assembly 304 function together in any manner known in the art to produce a video stream which is passed to the video transmission assembly 330 that then transmits the video stream data to any compatible video receiver via wireless transmission antenna 332.

In one embodiment of the targeting assembly 300, the solid-state electronic image sensor 308 would be sensitive to light in the visible electromagnetic spectrum. In such an embodiment, the video data stream produced, transmitted, and utilized by a user would be a generally accurate representation of what the user would see with their own eyes were they to look in the general direction that the targeting assembly 300 was directed. Because the targeting assembly 300 can be manipulated by the user, however, the field of view seen by the user through the targeting assembly could conceivably be beyond what the user could see with her own eyes (i.e., if the targeting assembly 300 was held above the user's head) or beyond what the user could see without placing herself in danger (i.e., if the targeting assembly 300 was used to look around a corner for hostile targets.)

In another embodiment of targeting assembly 300, the solid-state electronic image sensor 308 would additional (or exclusively) be sensitive to light in the non-visible electromagnetic spectrum, such as infrared light. This would enable a user all of the advantages previous embodiment plus the ability to see other characteristics of the field of view theretofore invisible to the user, such as infrared radiation.

In other embodiments of targeting assembly 300, the solid-state electronic image sensor 308 may be capable of increasing visibility in low-light environments so that a user can see objects or targets that they otherwise would be unable to seen due to darkness. In an embodiment, the solid-state image sensor 308 may include a variety of pixel counts sufficient to categorize the sensor 308 as producing a standard definition, high definition, 4 k definition or other sensor category. Further, the sensor 308 may include a sensor with characteristics unrelated to standard sensor nomenclature regarding definition levels.

In other embodiments, video image processing microchip 310 may be capable of introducing a digital representation of firearm or weapon reticles to the video stream data it receives from solid-state image sensor 308. By combining the video images received from the field of view of targeting assembly 300 with a digital representation of reticles, the user may more accurately determine the precise target their firearm or weapon will hit. The digital composite of the targeting image may take the form of a traditional cross hair, single weighted center point, duplex reticle, mil dot reticle, range finder, circle, or other similar reticle configuration. Processing microchip 310 may also be configured to make additional enhancements to the received video stream including heads-up display information, system status information, or other user designated data.

The main body 302 may be manufactured from a range of materials, such as metals, alloys, polymers, composites, combinations therefore, or other materials that provide physical protection of the internal components while allowing reduced weight. For instance, in some configuration, aluminum and/or carbon-reinforced polymers are used.

The main body 302 may alternatively be encased in an exoskeleton 360, illustrated in dotted lines in FIG. 3B, that aids in protecting the main body 302 and the sub-assemblies located therein. The exoskeleton 360 may be made of the same material as main body 302 or another material depending on a particular need. For instance, main body 302 may be mounted within a waterproof exoskeleton when targeting assembly 300 will be used in a wet environment. Alternatively, the main body 302 may be encased in the exoskeleton that allowed a user an additional hand hold for manipulating the firearm or weapon that targeting assembly 302 was mounted on. Such an exoskeleton may be a separate component from the main body 302 installed within, or it may be physically attached to or integral from the main body 302 and provide additional support, protection, or other similar features to the targeting assembly 300. In some alternate embodiments, the main body 302 can be the exoskeleton.

In some embodiments, the main body 302 contains two cavities, a front cavity 340 and a rear cavity 342. The front and rear cavities 340 and 342 additionally contain various grooves, including 344, 346. The cavities and grooves are configured to contain various assemblies and sub-assemblies 304, 320, and 330, as well as the interconnects between the various assemblies and sub-assemblies as required for targeting assembly 300 to perform its various functions.

In one embodiment, front cavity 340 receives visual assembly 304. The front cavity 340 cooperates with the front groove 344 to receive the objective lens and shutter assembly 306 of visual assembly 304 and provide an unobstructed view to the exterior of the main body 302. Front groove 344 extends from front cavity 340 through the exterior wall 346 of main body 302. The front cavity 340 and groove 344 are configured to match the exterior profile of a housing of the objective lens and shutter assembly 304, such that it is protected from external forces and securely held in place while preforming its function of collecting light from the field of view corresponding to the orientation of the main body 302. For instance, the groove 344 may include a plurality of sub-grooves or recesses, with optional seals, that cooperate with the exterior of the housing of the objective lens and shutter assembly 304.

Rear cavity 342 is configured to contain both the power supply assembly 320 and the video stream data transmitter 330. Additional grooves may extend through the portion of main body 302 that partitions the front cavity 340 and rear cavity 342 to allow necessary hardware connections to run between components in the front cavity 340 and the rear cavity 342 (e.g., to allow electric connection between the visual assembly 340 and the video transmission assembly 330).

Although the rear cavity 342 is depicted as being vertically spaced apart from the front cavity 340, this need not be the case and the bottoms of the cavities 342 and 340 can be generally parallel or the bottom of the front cavity 340 can be closer to the weapon 106 than the rear cavity 342 when the main body 302 mounts to accessory rail 104, for instance.

In one embodiment, one component of power supply assembly 320 is a removable or rechargeable battery 322. The visual assembly 304 receives power from the battery by way of hardwired connections running between the battery 324 in rear cavity 342 to the visual assembly 304 contained within front cavity 340. Similarly, video stream data transmission assembly 330 also receives power from power supply assembly 320 through hardwired power connections.

It should be appreciated that, the various grooves and cavities are configured to precisely receive the various subcomponents within the housing. By doing this, the cavities and grooves function together to protect the internal components from external factors that may be detrimental to proper functioning such as weather, physical impact, or the like. In addition, the various cavities and grooves may include sub-grooves and recesses similar to those described with respect to groove 344. In addition, the surfaces of each of the grooves and cavities can have a continuous surface or intermittent or broken surface while still supporting whichever components are mounted therein or thereto. Further, the cavities and grooves can alternatively or additionally include one or more seals or cushioning members, such as rubber, foams, etc., to limit transmission of shock forces to mounted components. The cavities and grooves, and associated components of the targeting system can include cooperating locking features, such as detents, threads, pins, etc. which allow releasable connecting, coupling, or otherwise mounting of different components of the targeting system to the main body. Alternatively, those components can be joined with the main body 320 by adhesives, thermal bonds, or other manners of securely attaching those components to the main body 320.

Additionally, the cavities and grooves may decrease the difficulty required to install, repair, or upgrade internal components. For instance, video camera technology like that employed in visual assembly 304 is frequently improved. In the future, a newer visual assembly may simply be dropped into the place of current visual assembly 304 by a user to upgrade the functionality of the targeting assembly 300. Alternatively, as was described in reference to FIG. 1, the visual assembly may be interchangeable with assemblies that include solid-state image sensors sensitive to additional or alternative frequencies of electromagnetic radiation.

Likewise, battery technology like that employed in power assembly 320 is likely to be improved in the future yielding batteries with more desirable characteristics such as longer life, shorter recharge times, or reduced weight. In the modular design employed by targeting assembly 300, rechargeable battery 322 could be easily replaced in the future to increase the capabilities of the targeting assembly.

Turning back to FIG. 3A, power assembly 320 also includes on/off power switch 326 or power controller. Switch 326 is mounted within a cavity that extends from the exterior of main body 302 into rear cavity 342 and connects to rechargeable battery 322. Generally, the switch 326 regulates power flow from the power assembly 320 into the visual assembly 304 and video stream transmission assembly 330. Due to its placement on the side of main body 302, the switch 326 can mate with any suitable weapons holster 380 to enable automatic power on or off switching whenever the weapon is drawn or holstered.

Figure 3C:
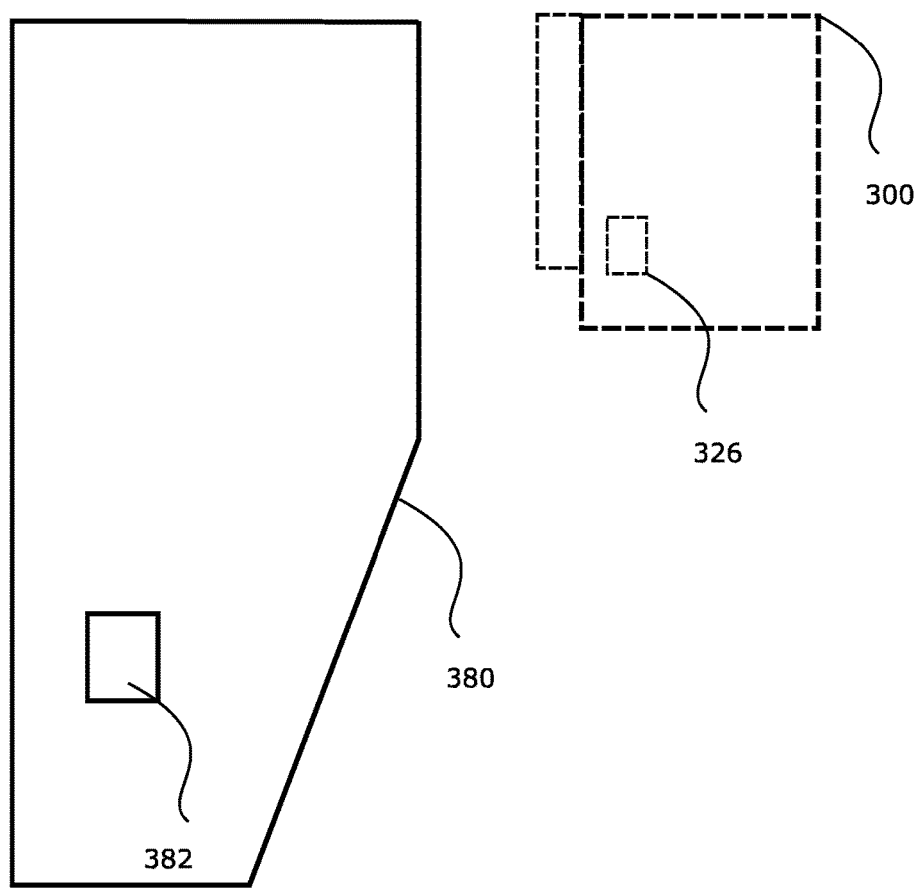
FIG. 3C illustrates a relationship between a portion of the targeting system of FIG. 1 and a holster for a weapon, according to an embodiment.

For example, as illustrated in FIG. 3C, a user may have a weapon with a mounted targeting assembly 300 holstered in a suitable holster 380. In this position, switch 326 would be in the "off" position to conserve the life of battery 324. Further, in this position no video data stream would be collected by visual assembly 304 or transmitted by video stream data transmitter 330. When the user withdrew the weapon from the holster 380, switch 326 would be engaged by a complementary element or structure 382 of the holster 380, such as a recess, cavity, detent, pin, extending member, or other structure, to change switch 326 to the "on" position. Simultaneously, visual assembly 304 would begin producing video stream data and passing it to video stream data transmission assembly 330 for transmission to the user.

By enabling automatic on/off switching synced with the withdrawal and holster of a targeting assembly mounted weapon improves both the power consumption profile of the device as well as ensuring that video transmission to the user will begin automatically when the device is drawn. This improves both the functionality of the device and the safety of the user.

Various other types of switches or complementary engagement between the switch and a holster or other structure configured to hold a weapon are possible. For instance, the complementary engagement between the holster and a switch or other controller for controlling power delivery to the targeting system can occur with drawing or holstering the weapon in different direction, i.e., a generally upward movement from the holster, a generally forward movement from the holster away from a user, a generally rearward movement from the holster and away from the user, a generally sideward movement from the holster and away from the user, or any combination of those movements. In addition, various types of switching structures are possible, with it being understood that portions of the "switch" can be distributed between the targeting assembly and the holster, such that in some cases a circuit has a first state causing the targeting assembly to be turned off when the targeting assembly, and associated weapon, are supported in the holster, and a second state causing the targeting assembly to be turned on when the targeting assembly, and associated weapon, are removed from the holster. Switches include, but are not limited to, toggle switches, pushbutton switches, proximity switches, optical or electromagnetic radiation switches, pressure switches, or other switches that would change on/off state of the target assembly through separation of the target assembly and a structure, such as a holster, for selectively holding a weapon.

Targeting assembly 300 of FIG. 3A also includes a weapons accessory rail mounting assembly 350. The mounting assembly includes a fixed attachment rail 352 that extends longitudinally along the bottom face of main body 302 from the front or front-facing portion of the device to the rear or rear-facing portion. Attachment rail 352 may be formed out of a portion of main body 302, although the attachment rail 352 can be removably mounted to the main body 302, and has a profile that matches the exterior profile of a weapons accessory rail (not shown). Mounting assembly 350 also includes a removably attached adjustable attachment rail 354. Adjustable attachment rail 354 has a profile that matches the exterior profile of a weapons accessory rail. When attachment rail 354 is installed, the area between rail 352 and 354 creates a profile to securely attach targeting assembly 300 to a compatible weapons accessory rail such as accessory rail 104 from FIG. 1. Stated another way, the area 350 between the profiles is complementary to an inverse profile of a suitable weapon accessory attachment rail.

To aid in securing the targeting assembly to a weapon, the mounting assembly also includes rail mounting pin 356 with a corresponding rail mounting pin guide 356. Mounting pin 356 may be formed from the main body 302 or separately selectively removably mounted to main body 302. The mounting pin 356 serves as a guide for mounting adjustable rail 354 by sliding through the mounting rail guide 358 found therein. In one embodiment, the rail mounting pin 356 is threaded such that a thumb screw can be used to secure detachable rail 354 in place once the mounting pin has been extended through and beyond rail mounting pin guide 358. Alternatively, setscrews or other structures can be used to selectively mount the adjustable rail 354 to the main body 302, whether or not the main body has the mounting pin 356. For instance, the adjustable rail 354 can slidably mount with a complementary structure extending along the main body 302 from the front facing portion towards the rear facing portion, or vice versa, with the position of the adjustable rail 354 being governed by a set screw extending through a portion of the main body and contacting the adjustable rail 354. Optionally, a closed end of the complementary structure would limit movement of the adjustable rail 354.

It should be appreciated that adjustable attachment rail 354 is able to be secured in place at any distance from fixed attachment rail 352 according to the length of rail mounting pin 356 or other mechanism as discussed above. This variable width characteristic allows targeting assembly 300 to be mounted securely on weapons accessory rails of various widths so long as the exterior profile of the rail matches the inverse profile 350 of the attachment rails in mounting assembly. Further, by mounting targeting assembly 300 to an accessory mounting rail as an additional citing mechanism on a weapon, any other sighting systems on the firearm then become a backup feature if any component of the targeting system 300 fails.

Another targeting system is described in the following paragraphs in reference to FIGS. 4-10. It should be noted that any of the suitable configurations or descriptions included above in connection with the previously described targeting system as shown in FIGS. 1-3C may be applied to the targeting system of FIGS. 4-10, and vice versa. Therefore, description included in either targeting system is not necessarily meant to imply to only that targeting system but, rather, may be applied to various targeting systems based upon the disclosure contained herein and which one skilled in the art would understand from the contained disclosure.

Figure 5A:
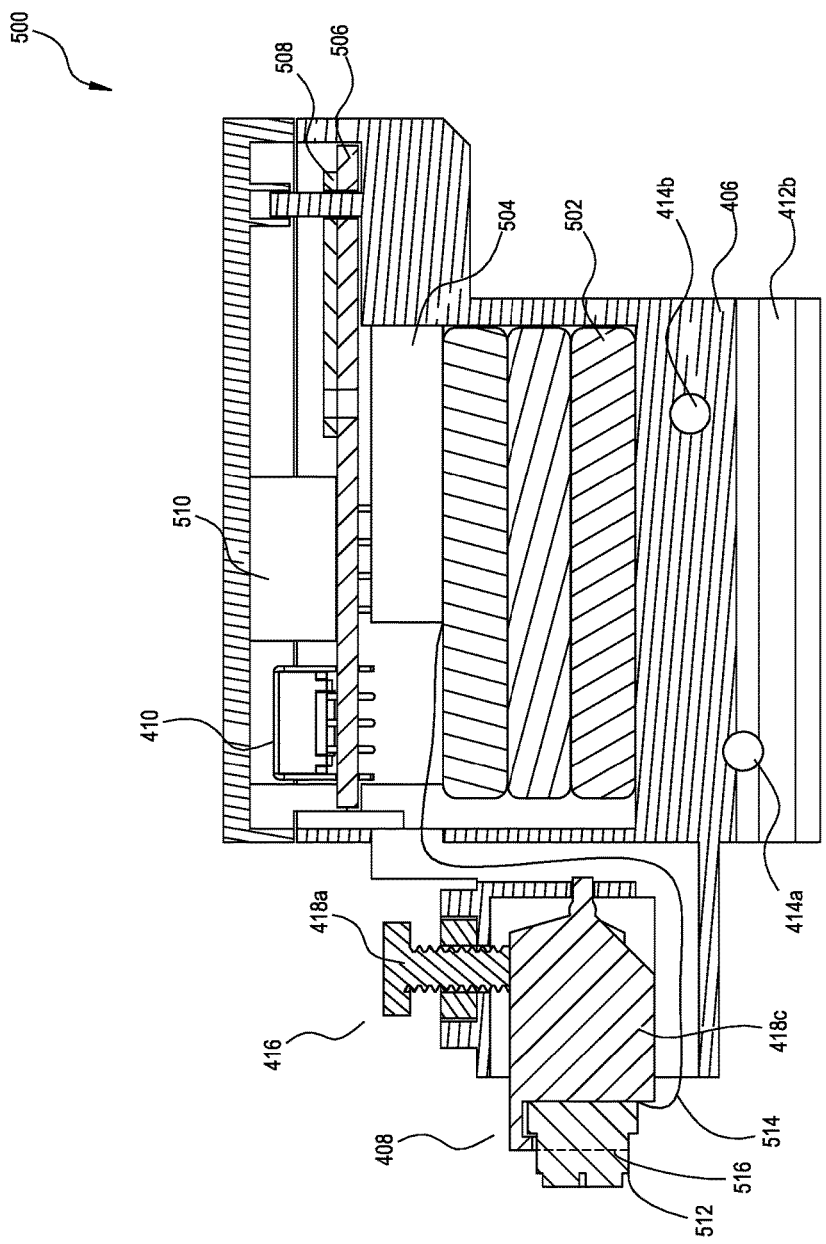
FIG. 5A illustrates a cross-section of a targeting assembly portion of a targeting system along with several sub-assemblies included in the targeting assembly, according to an embodiment.
Figure 5B:
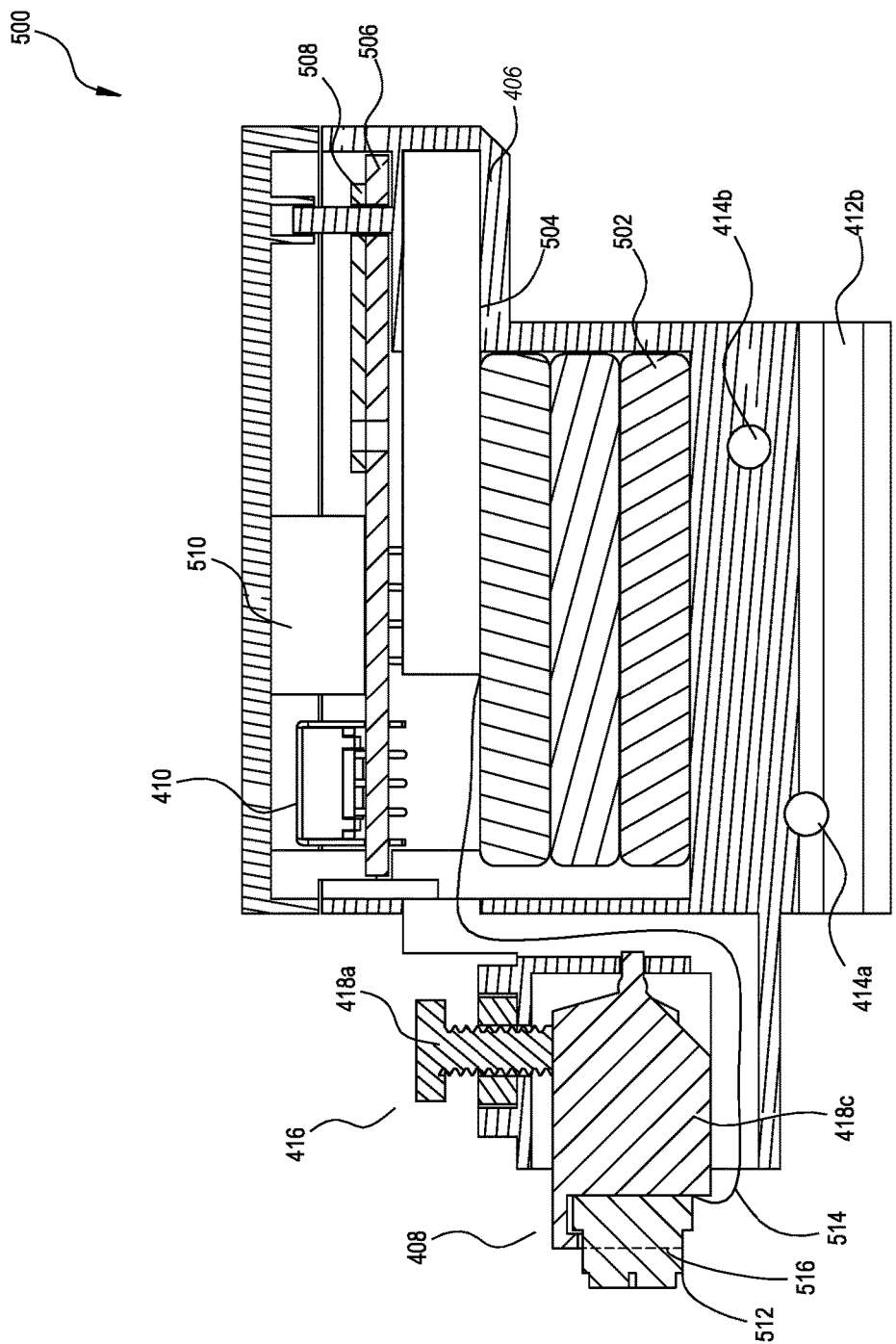
FIG. 5B illustrates an alternative cross-section of a targeting assembly portion of a targeting system highlighting the arrangement of some sub-assemblies included therein, according to an embodiment.
Figure 7A:
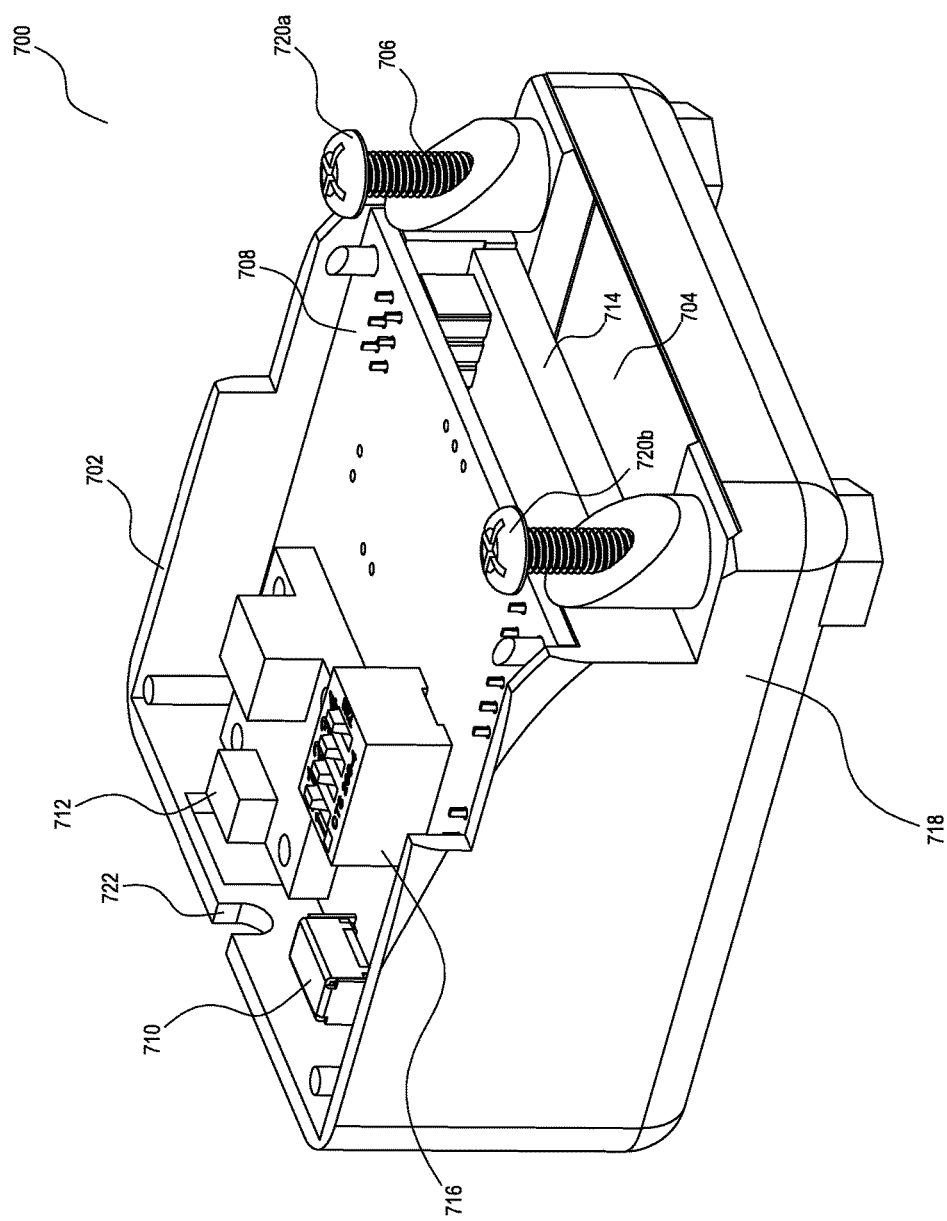
FIG. 7A illustrates a video receiver module and battery pack assembly, along with several sub-assemblies, of a targeting system, according to an embodiment.
Figure 7B:
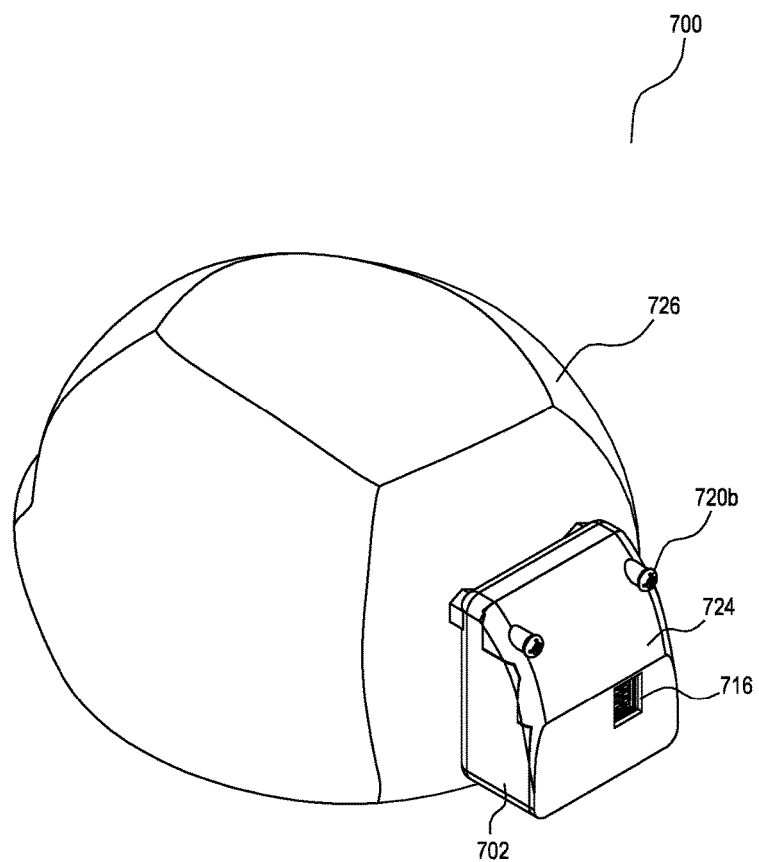
FIG. 7B illustrates an alternative view of a receiver module and battery pack assembly in a configuration installed on a user helmet, according to an embodiment.

Turning now to some embodiments of a targeting system, FIG. 4 illustrates one embodiment of a targeting assembly 402 of a targeting system 400. The targeting assembly 402 is used to visualize a target while reducing risk to the system's operator. Additionally, a targeting system as described herein can utilize an accessory rail 404 of a weapon or alternate direct attachment to a portion of a weapon thereby facilitating use of the system for various weapon systems. FIGS. 5A and 5B illustrate embodiments of a visualization assembly 500 of the targeting system. The visualization assembly includes viewing assembly 502 and user eyeglasses 504. FIG. 7A and FIG. 7B are illustrations of one embodiment of a transmission receiver and battery back assembly 700 of the targeting system 400.

In some embodiments, targeting assembly 402 of FIG. 4 is configured to transmit a video stream to transmission receiver and battery pack assembly 700 of FIG. 7A. Assembly 700 is then configured to process the video stream and then transmit the video stream to viewing assembly 802 of visual assembly 800 of FIG. 8A. In this manner, a user is able to see a field of view captured by the targeting assembly 402 without necessarily needing to be able to see the same field of view with their naked eye. The benefits of such a system are broad and include increased user safety, faster firearm sighting, and increased visualization capabilities (e.g., infrared, night vision, etc.).

Specifically, in some embodiments, a user of targeting assembly 402 and visualization assembly 800 can manipulate a weapon to target anything in the firing direction of the weapon without having to place the weapon near the user's head. For instance, a user could manipulate the weapon and attached targeting assembly 402 to view around an obstruction, such as a wall, while still allowing the user to see targets via viewing assembly 802.

By decoupling the video display system from the video capture system, a user has greater ability to acquire targeting information that, if required manually to sight, would be either impossible or dangerous for the user. The targeting system also cuts the amount of time it takes to aim and fire because, once powered on, the user can immediately begin aiming. Such an immediate aiming system provides a significant tactical advantage in a battlefield or home defense environment by allowing a user to check safely around cover when moving into position by exposing only the weapon and targeting system to danger. It also allows a user to attack and defend a position by shooting accurately around cover. A user may also check under doors or overhead before breaching an obstruction.

Turning back to FIG. 4, in one configuration the targeting assembly 402 is removably attached to an accessory rail 404. Accessory rail 404 may be mounted to a firearm, drone, toy, or other device. The targeting assembly 402 includes several sub components responsible for differing functions. For example, in some embodiments, targeting assembly 402 will include a visual assembly for capturing video in the field of view, a video stream transmission assembly for processing and then transmitting the collected video from the visual assembly to other components, and an electrical power assembly responsible for providing power to the necessary components.

In some embodiments, the visual assembly can utilize an objective lens and one or more image sensors and image processors to produce a video stream. The video stream of the visual assembly connects to the video stream data transmission assembly for transmitted by the transmission assembly to another assembly, such as a viewing assembly. The electrical power assembly can independently power both the visual assembly and the video stream data transmission assembly.

In the embodiment illustrated in FIG. 4, the targeting assembly 402 includes a main body 406 that has a top face 430 and a bottom face 432. The main body 406 is also oriented into a front facing portion 434 and a rear-facing portion 436 where the front facing portion 434 corresponds to the direction that a user would point or aim the device on which the targeting assembly 402 is mounted. The bottom face 432 includes a first attachment rail 412b extending the length of the main body and a second attachment rail 412a extending the length of the main and being removably attached to the bottom face. In some embodiments, the area formed between attachment rail 412a and attachment rail 412b is complementary to the inverse profile of a suitable weapon accessory attachment rail, such as accessory rail 404.

In some embodiments, targeting assembly 402 includes a visual assembly 408 located at the front face 434 of main body 406. In some embodiments, visual assembly 408 includes one or more objective lenses, one or more solid-state electronic image sensors such as a CCD or CMOS image sensor, and one or more image processing and transmission components. In some configurations, the body of the visual assembly 408 is located within a cavity of main body 406 with a portion of a lens housing extending through a groove of the exterior of the main body 406. In some embodiments, the orientation of visual assembly 408 is adjustable with adjustment subassembly 416 in order to sight in the attachment with the firearm so the system can be accurate (embodiments of adjustment mechanism 416 with associated adjustment member 418a and 418b are more fully disclosed in conjunction with FIG. 6A and FIG. 6B).

In some embodiments, an adjustable or multi-angle lens 516 (illustrated as a dotted line) may be interchanged in front of the image capture chip of visual assembly 408 for zoom capabilities without a scope. The lens itself may also include an automatic or manual combination zoom feature. The lens focal length can also be automatically adjusted or manually adjusted.

In one embodiment, targeting assembly 402 mounts to or otherwise securely mates with a weapon having a rail mount or accessory rail like the accessory rail 404 shown in FIG. 4. For instance, the targeting assembly 402 may include structures complementary to a Picatinny rail, Lever rail, Weaver rail, NATO rail, or other rail-like structure that aid with the mounting of various accessories to a weapon. FIG. 4 depicts an accessory rail 404 as may be installed on the lower portion of a weapon; however, those skilled in the art will understand that the accessory rail 404 can be on an upper portion of a weapon's receiver, on a side of a weapon's receiver, or on some other portion of the weapon.

In some embodiments, mounting hardware 414a and 414b are configured to mate with accessory rail 404 in order to secure targeting assembly 402. Mounting hardware 414a and 414b prevent rotational movement of targeting assembly 402 by securing removable mounting rail 412a and a fixed mount rail 412b to accessory rail 404. Stated another way, the profile formed between rails 412a and 412b is complementary to an inverse profile of a suitable weapon accessory attachment rail such as accessory rail 404.

In some embodiments, mounting hardware 414a is positioned such that it rests within one of the recesses 420 of accessory rail 404 to prevent movement along the longitudinal axis of the accessory rail 404. Because the pattern of recesses differs among available accessory rails, mounting hardware 414b can be positioned such that it does not directly engage with the recesses 420 of accessory rail 404. This ensures that targeting assembly 402 can fit the most number of accessory rail configurations. In one configuration, the mounting hardware 414b is spaced from the recesses 420 in a direction towards the top face 430.

Thus, by tightening mounting hardware 414a and 414b, movable attachment rail 412a and fixed attachment rail 412b will engage with a complimentary exterior profile of accessory rail 404. At the same time, mounting hardware 414a is configured to engage with a complimentary recess 420 of accessory rail 404. The result is a targeting assembly 402 that is securely attached to accessory rail 404 longitudinally, transversely, and rotationally.

In some embodiments, attachment rails 412a and 412b extend longitudinally along the bottom face 432 of targeting assembly 402 from the front or front facing portion of the device to the rear or rear-facing portion. In some embodiments, (i.e, as shown in FIG. 5A) attachment rail 412b is formed out of a portion of main body 406, although attachment rail 412b may also be removably mounted to the main body 406 with screws, bolts, setscrews, grooves, or the like.

In some embodiments, mounting hardware 414a and 414b may be comprised of threaded bolts with mated threaded nuts. In some embodiments, a threaded nut portion may be integrally formed within fixed mounting rail 412b or movable mounting rail 412a. Mounting hardware 414a and 414b may be made of metal, alloy, plastic, or any other suitable material sufficient to secure targeting assembly 402 to accessory rail 404 to prevent movement. In other embodiments, the long portion extending between the attachment rails may simply guide movable attachment rail 412a while securing occurs with a threaded nut, knob, thumbscrew, or the like threaded onto mounting hardware 414a and/or 414b. In some embodiments, a combination of tightening configurations may be employed so long as mounting rails 412a and 412b can be tightened against the profile of accessory rail 404.

In some embodiments, a protrusion or surface modification other than a threaded rod may serve to secure the targeting assembly 402 to an accessory rail 404 in a manner that will prevent longitudinal movement during use. For instance, in some embodiments, a protrusion may be formed out of main body 406 extending from main body 406 into recesses 420 of accessory rail 404.

It should be appreciated that because the length of mounting hardware 414a and 414b can be varied, targeting assembly 402 can be secured in place on an accessory rail 404 of any width within the range the length of the mounting hardware. This variable width characteristic allows targeting assembly 402 to be mounted securely on weapons accessory rails of various widths so long as the exterior profile of the rail matches the inverse profiles of the attachment rails 412a and 412b. Further, by mounting targeting assembly 402 to an accessory mounting rail as an additional citing mechanism on a weapon, any other sighting systems on the firearm then become a backup feature if any component of the targeting system 402 fails.

It should be appreciated that targeting assembly 402 can be mounted in any orientation relative to the device on which it is mounted. In some configurations, targeting assembly 402 will be mounted right-side-up, such as an AR-15 type weapon, while in other configurations it will be mounted upside down. In some configurations, it may be mounted on the side of the device. Regardless of the orientation of targeting device 402, the orientation of the image viewed by the user would be changed, such as by being flipped, to present the user with the appropriate view. Additionally, sensors within targeting device 402 may also sense the orientation of the targeting device and adjust the video accordingly. This could be accomplished through the use of accelerometers, magnets, video analysis, hall-effect sensors, or the link.

In some embodiments, targeting assembly 402 can be part of a kit, such as kit 4000 schematically illustrated in FIG. 10, which includes various mounts to facilitate mounting of a targeting assembly (like that illustrated in FIG. 4) to different structures, such as accessory rails, scopes, barrels, or toys. For instance, a main body can be modified to releasably mount to a structure specific mount, such as an accessory rail mount, a scope mount, a barrel mount, or toy mount. In still another configuration, the previously described kit could include mounts to allow the components of the targeting assembly to be mounted to a drone, providing a compatible and durable first-person viewer (FPV) solution.

Such kits would allow the targeting assembly to be compatible with a wider variety of firearms, weapons, or other suitable devices like drones. Such wide compatibility one unique aspect of the present targeting assembly compared to other weapon integrated camera-display systems.

In still other configurations, the body supporting the structures of the targeting assembly can be formed in the shape of a part of a weapon to allow for the targeting assembly to be built-in or incorporated in the weapon. For instance, in one configuration the targeting assembly can be incorporated in or replace a spring guide rod of a weapon.

In some embodiments, targeting assembly 402 also includes power controller switch 410 mounted within a cavity in main body 406 and extending from the exterior of main body 406 to the interior. Power controller 410 connects to and controls the discharge of power from batteries deposited within targeting body 406 (and discussed in more depth in conjunction with FIG. 5A). Generally, the switch regulates power flow from batteries into the visual assembly 406 and other components within targeting assembly 402 that require power.

Due to its placement on the side of main body 406, the controller 410 can mate with any suitable weapons holster to enable automatic power on or off switching whenever the weapon is drawn or holstered. Depending on the embodiment, the controller may comprise a physical on/off toggle switch, while in more advanced configurations a magnetic reed toggle switch, light sensing toggle switch, motion sensing toggle switch, or any other toggle switch that allows automatic on/off functionality may be utilized.

As one example, in configurations utilizing simple, physical toggle switches, a user may have a weapon with a mounted targeting assembly 402 holstered in a suitable holster. In this position, controller 410 may be in the "off" position to conserve power. Further, in this position, no video data stream would be collected or transmitted by visual assembly 408. When the user withdrew the weapon from the holster, controller (switch) 410 would engage a complementary element of the holster, such as a recess, cavity, detent, pin, extending member, or other structure, to change controller 410 to an "on" position. Visual assembly 408 would then begin producing video stream data and passing it to video for transmission to the visual assembly of FIG. 5A.

In embodiments that utilize advanced switches (as discussed above), a minimal but sufficient amount of power would constantly be supplied to the switch. Thus, in order to conserve power when not in use, such switches may be controlled through a manual sleep mode switch. In such embodiments, having the sleep mode in the off position would cut all power flowing from the battery while having sleep mode on would allow power to flow only to the advanced toggle switches. Then, the advanced toggle switch could be configured to determine whether the entire targeting assembly should be powered or not. In this manner, the advanced toggle switches save power while leaving the system generally in a position to rapidly come online By enabling automatic on/off switching synchronized with the withdrawal and holster of the weapon, or though utilization of a sophisticated switch that requires less power than the targeting assembly as whole, the power consumption profile of the device is improved while ensuring that video transmission to the user will begin automatically when the device is drawn. This improves both the functionality of the device and the safety of the user.

In other embodiments, other types of switches or complementary engagements between the switch and a holster or other structure configured to hold a weapon are possible. For instance, the complementary engagement between the holster and switch, or other controller, for controlling power delivery to the targeting system can occur with drawing or holstering the weapon in different direction, (i.e., a generally upward movement from the holster, a generally forward movement from the holster away from a user, a generally rearward movement from the holster and away from the user, a generally sideward movement from the holster and away from the user, or any combination of those movements.)

In addition, various types of switching structures are possible, with it being understood that portions of the "switch" can be distributed between the targeting assembly and the holster, such that in some cases a circuit has a first state causing the targeting assembly to be turned off when the targeting assembly, and associated weapon, are supported in the holster, and a second state causing the targeting assembly to be turned on when the targeting assembly, and associated weapon, are removed from the holster.

Switches include, but are not limited to, toggle switches, momentary pushbutton switches, proximity switches, optical or electromagnetic radiation switches, magnetic switches such as a reed switch or hall effect switch, pressure switches, or other switches that would change on/off state of the target assembly through separation of the target assembly and a structure, such as a holster, for selectively holding a weapon.

The main body 406 may be manufactured from a range of materials, such as metals, ceramics, nanomaterial's, biomaterials, smart materials, alloys, polymers, composites, combinations therefore, or other materials which provide physical protection of the internal components while allowing reduced weight. The materials may also be different for different parts in the assemblies to serve a certain function. For instance, in some configurations, aluminum for the attachment and a combination assembly of parts made of high and low density polymers for the monocular assembly and/or carbon-reinforced polymers may be used.

The main body 406 may alternatively be encased in an exoskeleton that aids in protecting the main body 406 and the sub-assemblies located therein. The exoskeleton may be made of the same material as main body 406 or another material depending on a particular need. For instance, main body 406 may be mounted within a waterproof exoskeleton when targeting assembly 402 will be used in a wet environment. Alternatively, the main body 406 may be encased in an exoskeleton that allows a user an additional hand hold for manipulating the firearm or weapon that targeting assembly 402 was mounted on. Such an exoskeleton may be a separate component from the main body 406 installed within, or it may be physically attached to or integral from the main body 406 and provide additional support, protection, or other similar features to the targeting assembly 402. In some alternate embodiments, the main body 406 can be the exoskeleton.

As illustrated in FIG. 4, targeting assembly 402 also includes visual assembly 408 and visual assembly adjuster subassembly 416. However, both of these assemblies are better illustrated using subsequent figures and will be discussed in due course.

One embodiment of the targeting assembly 402 of FIG. 4 is shown in greater detail in FIG. 5A. In FIG. 5A, a cross-section of targeting assembly 402 is illustrated as targeting assembly 500 and exposing several subassemblies. Targeting assembly 500 includes main body 406, a visual assembly 512, a battery assembly 502, video processor 504, printed circuit board 506, integrated video transmission component 508, and transmission channel selector 510. As understood by one skilled in the art, the visual assembly 512 is configured to include the components to collect and signal a video feed representing the field of view of the targeting system and would likely include sub-components shown as dotted line 516 including an objective lens and shutter assembly, at least one solid-state electronic image sensor (such as a CCD or CMOS image sensor), and any compatible solid-state video image processing microchip known in the art. As will be discussed in FIG. 6A and FIG. 6B, the visual assembly 512 may also be adjustable to allow the targeting assembly 402 to be easily calibrated to different firearms.

In some embodiments, battery assembly 502 is connected to power controller 410, a charging port, and a power charge regulator such as a microcontroller programmed with a low voltage cut off. Battery assembly 502 is also connected to the other internal components of targeting device 502 in order to supply power for operation.

For example, in some embodiments, battery assembly 502 also provides power to visual assembly 512 in order to power the image sensor and transmit sensor data to video processor 504. Likewise, power is provided to video processor 504 in order to process raw video received from visual assembly 512 into a format that can consumed by a user. In some embodiments, video processor 504 may also be configured to modify or enhance raw video received from visual assembly 512.

In one embodiment of the targeting assembly 500, a solid-state electronic image sensor 516 may be sensitive to light in the visible electromagnetic spectrum. In such an embodiment, the video data stream produced, transmitted, and utilized by a user would be a generally accurate representation of what the user would see with their own eyes were they to look in the general direction that the targeting assembly 402 was directed. In some embodiments, the video stream would be enhanced by video processor 504 to include a reticle, digital cross hair, or other targeting aid. Such enhancement may occur at the targeting assembly 402 prior to transmission using an appropriate reticle generator, or it may occur after transmission but before display to the user. By combining the video images received from the field of view of targeting assembly 402 with a digital representation of reticles, the user may more accurately determine the precise target their firearm or weapon will hit. The digital composite of the targeting image may take the form of a traditional cross hair, single weighted center point, duplex reticle, mil dot reticle, range finder, circle, or other similar reticle configuration.

Because the targeting assembly 402 can be manipulated by the user, however, the field of view seen by the user through the targeting assembly could conceivably be beyond what the user could see with her own eyes (e.g., if the targeting assembly 402 was held above the user's head) or beyond what the user could see without placing herself in danger (e.g., if the targeting assembly 402 was used to look around a corner for hostile targets.)

In another embodiment of targeting assembly 402, the solid-state electronic image sensor of visual assembly 512 would be configured, additionally or exclusively, to receive and transmit light in the non-visible electromagnetic spectrum, such as infrared light. In such embodiments, an infrared light source may be included in the targeting assembly, or separate from the targeting assembly, so that the targeting assembly camera may be able to detect reflected infrared light. This would enable a user all of the advantages previous embodiment plus the ability to see other characteristics of the field of view otherwise invisible to the user, such as infrared radiation. Similarly, thermal imaging sensors may be incorporated within the targeting assembly to provide view of heat signatures within the sighting range of the targeting device. In some assemblies, the targeting assembly may have multiple sensor configurations that are switchable depending on the preference of the users. Further, where appropriate, multiple sensors may be employed simultaneously (e.g., a thermal image from a thermal sensor superimposed over an image that includes the visual light spectrum.)

In other embodiments of targeting assembly 500, the solid-state electronic image sensor of visual assembly 512 may be capable of increasing visibility in low-light environments so that a user can see objects or targets that they otherwise would be unable to seen due to darkness. In some embodiments, this may be done through software processing, while in other embodiments, hardware boosting may be employed. In some embodiments, an infrared light source may be configured to output greater amounts of infrared light rather than relying solely on the sensor to increase visibility.

In some embodiments, the solid-state image sensor of visual assembly 512 may include a variety of pixel counts sufficient to categorize the sensor of visual assembly 512 as producing a standard definition, high definition, 4 k definition or other sensor category. Further, the sensor of visual assembly 512 may include a sensor with characteristics unrelated to standard sensor nomenclature regarding definition levels.

In some embodiments, battery assembly 502 may also provide power to printed circuit board 506 and, in turn, to video transmission component 508 and associated transmission channel selector 510. Transmission component 508 is generally configured to receive processed video data from video processor 504 and transmit it for ultimate display at a device such as the user worn device illustrated in FIG. 8.

In some embodiments, video received at a video transmission component may be transmitted through a physical cable that passes from the image transmission component of targeting assembly 500 to a suitable video display device. In other embodiments, the image transmission assembly transmits images through a suitable wireless interface negating the need for a physical transmission cable.

One such example is illustrated in targeting device 500. There, video transmission component 508 is configured with wireless transmission capabilities. Such an embodiment would enable targeting device 500 to communicate with a compatible video receiver via a wireless connection protocol such as a BLUETOOTH, WiFi, UWB, 802.11x, or other wireless connection protocol utilizing electromagnetic wave technologies. As shown in the slight differences between the arrangement of components between FIG. 5A and FIG. 5B, the sub-assemblies contained within targeting device 500 may be altered while still maintaining the characteristics of a targeting system disclosed herein. For instance, in FIG. 5B, the video processing assembly 504 is shown as extending further to the rear of targeting assembly 500 than battery 502 as compared to the illustration shown in FIG. 5A. Additionally, as illustrated and discussed in conjunction with FIG. 5C, the main housing of targeting assembly 500 may be customized to provide support and installation points for the various components. Thus, the precise arrangement of assemblies, components, cavities, recesses, grooves, etc., is dependent upon the embodiment and may be adapted based on certain parameters.

In addition, the targeting assembly 500 can transmit video signals to a smart device utilized in place of or as part of the viewing assembly illustrated in FIG. 5. For instance, using a self-contained program or piece of software designed for a specific purpose, such as an app, the targeting assembly 500 can transmit video signals to a smart phone, smart eyewear, such as devices associated with GOOGLE GLASSES, RECON JET, VUZIX, or other smart device that could receive video signals. Wireless transmission may be controlled through channel selector 510 and may comprise a dipswitch for changing transmission channel between the camera and receiver that can be substituted, in some embodiments, with a digital channel switch. Additionally, where a manual channel selector is utilized, a corresponding access point must be provided through the main body of targeting system 500.

In still other configurations, to reduce the possibility of interference from surrounding targeting systems, the targeting assembly may include microprocessors or other controllers incorporated in one or both of the targeting assembly 500 and the receiver assembly 700 that can control channel switching and data transmission.

In some embodiments, targeting device 500 may also include removable storage functionality. Such capability allows the targeting system 500 to record video of firearm or weapon activity. For example, a recreational paintball player could record his match or a recreational hunter his trophy hunt. Recording functionality could also serve as an exoneration tool for self-defense, military, or law enforcement applications.

In such embodiments, a solid-state storage writer may be included as part of PCB 506 with an associated access port in the main body of targeting device 500 for installation and removal of a suitable solid-state storage card (e.g., a micro-SD card) of a preferred storage capacity. In other embodiments, onboard storage media may be employed along with a suitable means (e.g., wireless transmission component 508 or through cable based port and transmission) for transferring the stored data from targeting device 500 to a suitable viewer. In embodiments where local or removable storage is enabled or utilized, it is also recognized that wireless transmission and display of a video stream is also simultaneously possible.

In some embodiments, a port provides an electrical connection to battery assembly 502 that allows the battery to be electrically charged by any suitable exterior power source by a port such as a USB port, a micro-USB port, or any other suitable port. Another cavity contains a custom printed circuit board designed to connect all the electronic modules and chips together for durability and lowering manufacture time.

As illustrated by targeting assembly 500, the exterior body is formed in such a way that custom cavities are created to house the various internal operating components. For example, battery assembly 502 and video processing assembly 504 are shown in a large cavity in the main body surrounded closely by the exterior walls of targeting assembly 500. Above that cavity is an additional cavity designed to house the PCB, transmitter, and included components. Finally, adequate space and routing channels are provided to ensure that each component can be properly connected to the other components in order to ensure proper operation.

Figure 5C:
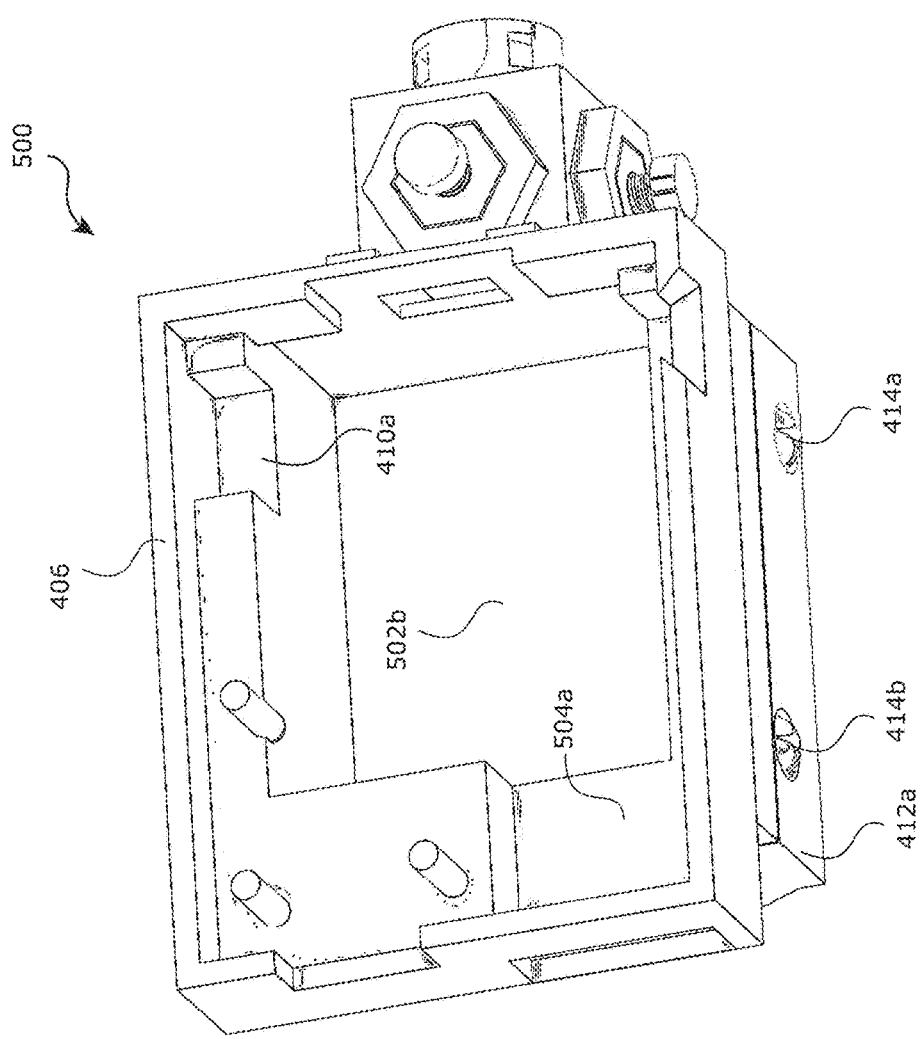
FIG. 5C illustrates some cavities and recesses of the main body of a targeting assembly portion of a targeting system that are configured to securely house sub-assemblies of the targeting assembly, according to an embodiment.

By customizing the housing of targeting assembly 500, the internal components are better protected from external forces and securely held in place while preforming their respective functions. As illustrated in FIG. 5C, the various grooves and cavities are configured to precisely receive the various subcomponents within the housing. Such cavities and grooves function together to protect the internal components from external factors that may be detrimental to proper functioning such as weather, physical impact, or the like. In addition, the various cavities and grooves may include sub-grooves and recesses similar based on the particular embodiment. In addition, the surfaces of each of the grooves and cavities can have a continuous surface or intermittent or broken surface while still supporting whichever components are mounted therein or thereto. Further, the cavities and grooves can include, alternatively or additionally, one or more seals or cushioning members, such as rubber, foams, etc., to limit transmission of shock forces to mounted components. The cavities and grooves, and associated components of the targeting system can include cooperating locking features, such as detents, threads, pins, etc. which allow releasable connecting, coupling, or otherwise mounting of different components of the targeting system to the main body. Alternatively, those components can be joined with the main body of targeting assembly 500 by adhesives, thermal bonds, or other manners of securely attaching those components to the main body.

For example, FIG. 5C shows cavity 502*b* configured to hold batteries 502 as shown in FIG. 5A. Additionally, cavity 504*a* is configured to hold video processing assembly 504. Similarly, cavity 410*a* is configured to hold switch 410. As was discussed in conjunction with the differences between FIGS. 5A and 5B, cavities 502*b*, 504*a*, and 410*a* may be modified and customized to fit the particular configuration of components desired in a given targeting system 500. For instance, cavity 504*a* may be extended toward the rear relative to that shown in FIG. 5A in order to accommodate the embodiment shown in FIG. 5B. Likewise, as was discussed previously, if an alternative power switch 410 is selected, main body 406 may be modified in order to customize cavity 410*a* to more precisely match the alternative power switch. Additionally, depending on the embodiment, one or more of cavities 502*b*, 504*a*, or 410*a* may be incorporated within other cavities or may be eliminated entirely.

Additionally, the cavities and grooves may decrease the difficulty required to install, repair, or upgrade internal components. For instance, video sensor and lens technology like that employed in visual assembly 512 are frequently improved. In the future, a user may upgrade the functionality of the targeting assembly 500 by dropping a newer visual assembly into cavity 504*a* in the place of current visual assembly 512. Alternatively, as was described in reference to FIG. 4, the visual assembly may be interchangeable with assemblies that include solid-state image sensors sensitive to additional or alternative frequencies of electromagnetic radiation. The video assembly may also contain multiple image sensors on the same adjusting cone in order to let the user switch between different electromagnetic frequencies to view in the screen. Each of those individual sensors may also be independently removable or upgradable, depending on the embodiment.

Likewise, battery technology like that employed in power assembly 502 is likely to be improved in the future yielding batteries with more desirable characteristics such as longer life, shorter recharge times, or reduced weight. In the modular design employed by targeting assembly 500, rechargeable battery 502 could be easily replaced in the future to increase the capabilities of the targeting assembly.

In one embodiment of targeting device 500, a separate battery back may be utilized to provide larger power reserves for longer use. In any power configuration, both the targeting device mounted on the weapon and the receiver and monocular device require power. Depending on the embodiment, a combination of batter types may be utilized across components. For example, in some embodiments, the targeting assembly mounted on the weapon might use a smaller, rechargeable battery pack while the receiver and monocular display utilize a pocket or pack mounted battery pack connected via cable. Where mobility and rapid deployment are valued, either or both components may utilize disposable batteries to eliminate recharge times.

In embodiments where rechargeable batteries or external battery packs are used, the individual assemblies requiring power (i.e., the receiver, monocular display, and targeting assembly) may be configured with a standardized power connect or charging port such as a USB variant like micro-USB. By utilizing a common charging port like micro-USB, users may also be able to recharge with common cables and transformers like those commonly used in mobile phone rechargers.

In some configurations, a combination of power sources may be used in a single assembly. For instance, each subassembly may include an embedded back-up battery that only provides power if a larger or primary power supply runs out or malfunctions. The visual assembly 22 receives power from the battery by way of hardwired connections 52 running between the battery 50 in rear cavity 38 through the middle groove 44 and to the visual assembly 22 contained within front cavity 36. Similarly, video stream data transmission assembly 32 receives power from power supply assembly 30 through hardwired power connections if no external battery is connected.

As illustrated in FIG. 5B, the precise arrangement of internal componentry may be modified and the associated cavities, recesses, or grooves of main body 406 may be adjusted to accommodate. In the illustrated embodiment, video processor 504 in FIG. 5B is shown as extending further to the rear of targeting system 500 as compared to FIG. 5A. Likewise, the structure of main body 406 has been modified to maintain a complimentary recess to house the component.

Figure 6A:
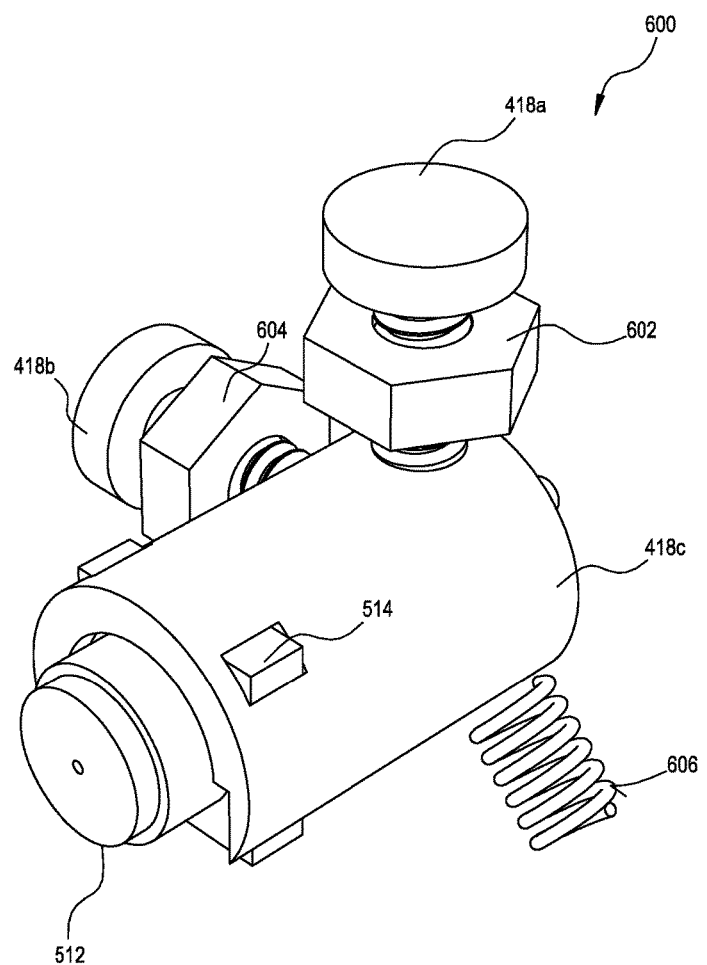
FIG. 6A is an illustration of an adjustable sighting mechanism subassembly of the targeting assembly portion such as the targeting assembly shown in FIG. 4 and FIG. 5A, according to an embodiment.
Figure 6B:
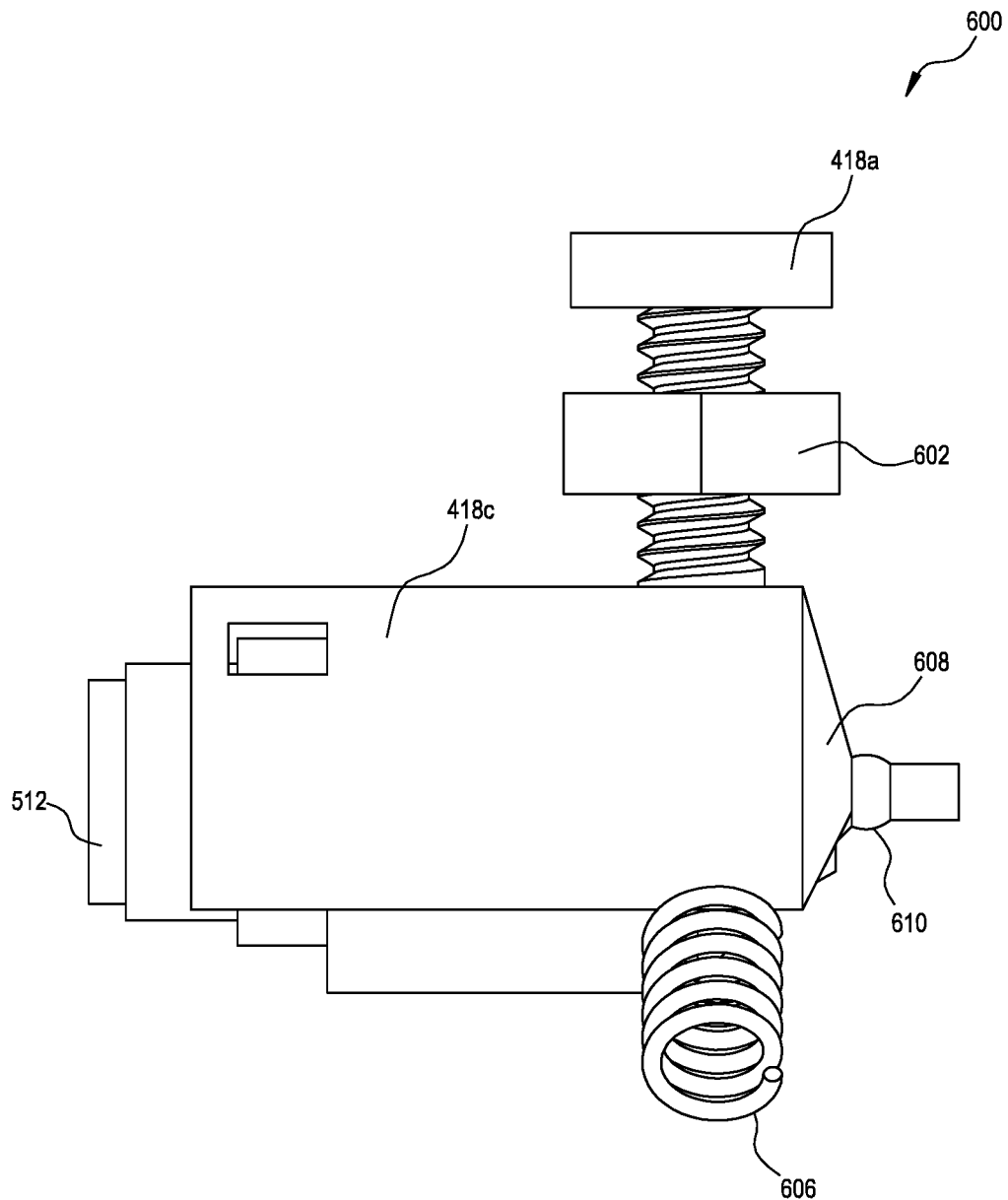
FIG. 6B is an is an illustration of an alternative view of an adjustable sighting mechanism such as the one illustrated in FIG. 3A, according to an embodiment

FIG. 6A and FIG. 6B illustrate two views of visual assembly adjuster 600. Visual assembly adjuster 600 includes adjuster members 418a and 418b, adjuster member retention nuts 602 and 604, and retention spring 606. Additionally, visual assembly housing 418c houses the visual assembly 512 that includes lenses, sensor chips, and other hardware necessary to produce a video stream as required by a particular embodiment.

Generally, visual assembly adjuster 600 enables the vertical and horizontal axes of visual assembly 512 to be independently fine-tuned for any firearm by utilizing adjustment points on the attachment (e.g., setscrews, knobs, springs, detents, etc.). The adjustment points on the top and one side hold the camera in place with the assistance of an opposing compression spring. The rear of the adjustment point allows the cone to pivot with the adjustment points while the opposing compression spring maintains retention.

Assembly housing 418c also includes rear profile cone 608 and adjuster reference pin 610. Finally, housing 418c also includes depression 514 that mates to an extrusion or other raised member of visual assembly 512 in order to keep visual member 512 consistently oriented within housing 418c.

When installed within a targeting assembly, such as targeting assembly 402 of FIG. 4, the components of visual assembly adjuster 600 function to allow the visual assembly 512 to be calibrated to a particular device. By manipulating members 418a and/or 418b in or out, housing 418c can be adjusted.

In some embodiments, the rear of housing 418c is conical in shape with a reference pin extending rearward from the apex of the cone, as represented by rear profile cone 608 and adjuster reference pin 610. In such an embodiment, housing 418c can be adjusted in any direction within the tolerances of the manipulation members while maintaining direct contact with a portion of the targeting assembly via adjuster pin 610. For example, housing 418c may be installed in main body 406 of targeting assembly 402. In this manner, adjuster reference pin 610 provides a consistent and fixed adjustment point.

Finally, retention spring 606 functions to provide a counter force to the force provided by adjustment members 418a and 418b. By utilizing a spring (rather than, for instance, a third manipulation member), housing 418c always remains firmly seated and attached with three points of contact.

Adjuster members 418a and 418b may be a screw or other adjusting mechanism and may be made from metal, alloy, plastics, polymers, or other suitably strong material. Likewise, the members may be adjustable simply by hand-manipulation or may require a specialized tool (e.g., a hex key) to ensure no inadvertent adjustments are made.

Thus far, disclosure has included a device-mounted targeting assembly capable of capturing video, processing video, and passing the processed video to a video stream transmission component. Turning now to FIG. 7A and FIG. 7B an embodiment of a remote video transmission receiver 700 is illustrated.

In FIG. 7A, a main receiver body 702 houses a battery 704, video receiver 706, and printed circuit board (PCB) 708 that further includes power switch 710, power port 712, and transmission channel selector 716. In some embodiments, switch 710, port 712, and channel selector 716 are physically soldered to PCB 708. In other embodiments, PCB 708 may be configured to include some or all of those components as integrated circuits. Thus, the exact method of including those components is less important that the inclusion of the functions that they ultimately perform.

Receiver body 702 also includes mounting screws 720a and 720b. In some embodiments, these mounting screws may both secure a protective lid (illustrated as lid 724 on FIG. 7B) and/or provide a means to mount the receiver body to another surface or attachment point (e.g., a helmet, belt, tactical pack, etc.). In some embodiments, a different attachment mechanism other than mounting screws 720a and 720b may be used for mounting or securing the receiver body 720 to an attachment point. Receiver body 702 also includes several recesses or grooves to the exterior of body 702 such as groove 722 configured to allow a cable or other transmission component access to the exterior of receiver body 702 (e.g., such as a charging cable or antenna.)

In some embodiments, transmission receiver 700 includes a solid-state video processor microchip 714 that processes the received video stream data and converts it into electrical signals appropriate for display on a viewing device, such as a video display 810 of display assembly 802, as illustrated in FIG. 8. The converted video stream data is passed from the video processor microchip 714 to the video display 810 along a physical cable connecting at port 808. In some embodiments, intermediary video processing may be required between video processor microchip 714 and video display 810. Such processing may occur at transmission receiver 700, monocle assembly 800, or at some additional video processing point between (e.g., a video transmission encryption component may be utilized for wireless transmission of video to ensure that the transmitted video stream cannot be viewed by unauthorized viewers.)

In some embodiments, the power saving configurations discussed above relating to the targeting system assembly 402 may also apply to the receiving assembly. For example, differing types of switches may be implemented within receiver 700 to better control power consumption while still ensuring rapid and automatic availability. A sleep mode may be configured enabling diminished power draw from the battery until the receiver detects a video transmission being sent from the targeting assembly. Once the signal is again stopped (e.g., if the weapon is holstered) the receiver 700 may be configured to reenter a sleep mode. In some embodiments, a delay may be configured such that temporary lapses in video transmission will not power the receiver down. In other embodiments, both a smart switch and a physical switch may be employed. This may be desirable to a user to ensure the receiver stays on (or off) regardless of whether video transmission is occurring.

In embodiments where a transmission channel selector is utilized, such as in receiver 700, the channel selector 716 should be compatible with and set to the same channel as the video transmission component of the targeting device, such as transmission component 508 of targeting device 500. In some embodiments, transmission channel selector 716 (and, e.g., 508) may be adjustable via dip-switches or other mechanical means. In other embodiments, both the transmitter and receiver may be configured via software, firmware, or some other suitable means known in the art.

In some embodiments, power port 712 may be configured to charge internal battery 704 from an external power source. Port 712 may utilize a common port and charging protocol like USB, or an alternative configuration. Additionally, because receiver 700 is designed to be carried by a user in a location that is less weight sensitive (e.g., waist, pack, helmet, etc.) the power capacity of receiver 700 may be substantial. In such embodiments, power port 712 may also be configured to supply power via a hardwired cable to another component of the targeting system. For example, a cable may be run from power port 712 to the monocular display shown in FIG. 8 to reduce the overall size and weight of the component. Additionally, in some configurations, receiver 700 may also or alternatively provide power to a targeting device such as targeting device 402 of FIG. 4.

In some embodiments, port 712 may be configured to allow an external battery to be connected in tandem with internal battery 704 such that reception of a video stream and subsequent transmission to a suitable viewer can continue to operate even if the internal battery is dead. Additionally, a power charge regulator, such as a microcontroller included in PCB 708, can be programmed with a battery protection program and utilized to ensure safe and proper charging of battery 704. In some embodiments, an external removable or rechargeable battery pack may be worn or carried by a user in a location other than the location of receiver 700. For instance, a user may mount receiver 700 with internal batter 704 on a helmet 726 (as illustrated in FIG. 7B). A user can then carry a larger capacity external battery connected to receiver 700 at port 712 in a location like the waist or a backpack. Finally, on/off switch 710 may regulate power flow to the other components.

Figure 8A:
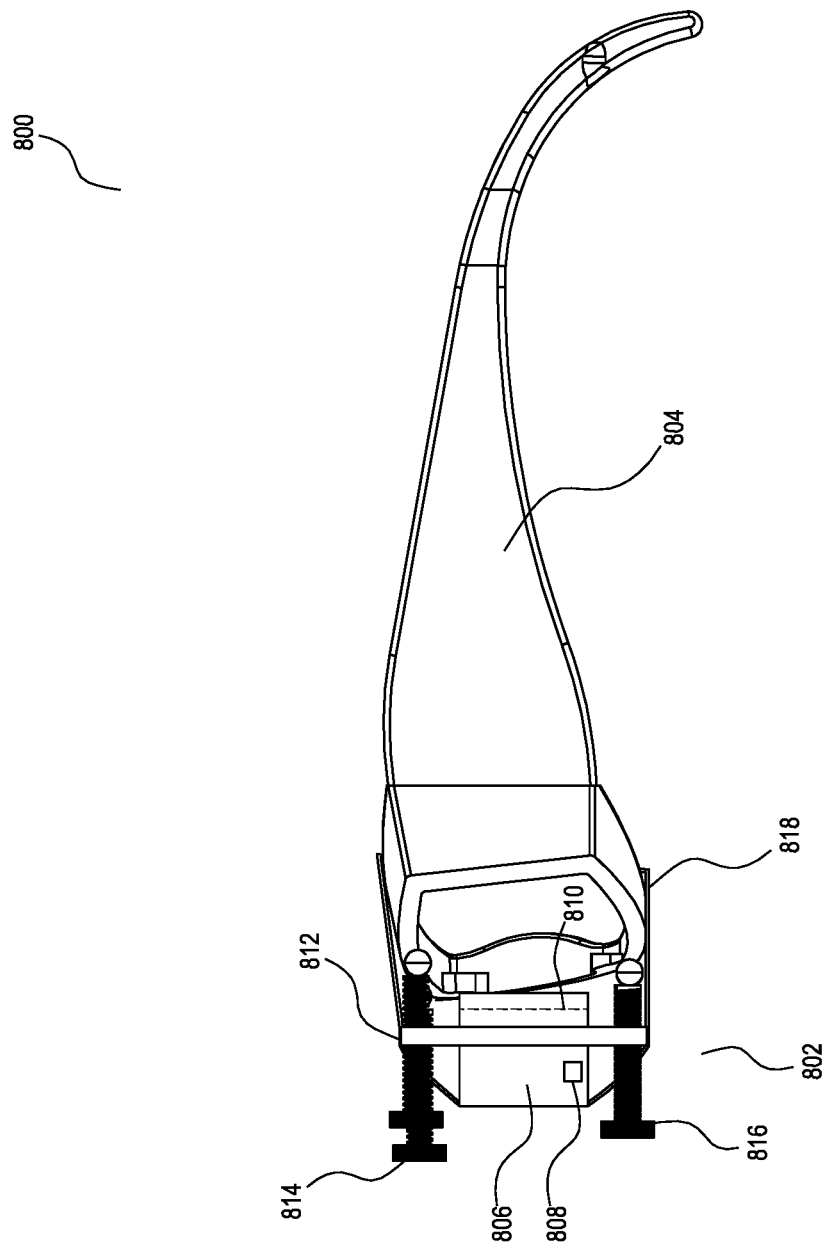
FIG. 8A is an illustration a display assembly portion of a targeting system as mounted to a user-worn eyeglass, according to an embodiment.

In some embodiments, the internal battery 704 of receiver 700 also provides electrical power directly to viewing assembly 800 as illustrated in FIG. 8A. To reduce weight and mitigate any additional interference to the user's field of view caused by additional cables, a single video transmission cable (not shown) may be configured to pass sufficient electrical power in addition to video stream data to video display assembly 802. In some embodiments, power and video may be passed to the video display on two separate transmission cables. Finally, in some configurations, a mixture of transmission methods may be employed (e.g., video transmitted using a wireless transmission protocol while power is supplied via a cable.)

In some embodiments, portions of receiver body 700, such as surface 718, may be comprised of metals, plastics, resins, or other materials like carbon fiber. In some embodiments, different areas of receiver body 700 may be made of different materials in order to support the internal function of the included components or to reduce weight, increase strength, or other goals. For instance, portions of receiver body 702 may comprise materials that reduce interference with wireless video transmissions near an antenna, while the rest of the assembly comprises materials that block exterior transmission of competing wireless signals.

Viewing assembly 800 includes video display assembly 802 and user glasses 804. The video assembly 802 includes a display housing 806, a connection port 808, and a display 810 (shown as dotted line). Further, in some embodiments, video assembly 802 is mounted to glasses 804 by means of a mounting frame 812 that includes planar adjusting arms 814 and attachment hardware 818.

By utilizing a monocular design for the viewing assembly, the targeting system allows a user to see both their normal field of view through the unobstructed eye as well as an augmented view of the targeting assembly mounted on the firearm with the other eye. However, in some embodiments, a video assembly 802 may also be provided over the user's second eye. In some such configurations, stereoscopic video may be provided. In other binocular configurations, each eye may receive a different version of the image transmitted from the targeting device. For instance, in configurations where the targeting assembly may be capable of detecting light from both the visible and infrared spectra, one video assembly may receive the "normal" view, while the other display receives an "enhanced" view.

In some embodiments, a data and/or power transmission cable may be utilized to transmit a video stream and sufficient power to operate the display 810 from port 712 of receiver 700 to port 808 of viewing assembly 800. By utilizing a single cable that can transport both streams, the overall size and of display assembly 802 can be minimized. However, it is recognized that in the future battery and video reception and processing hardware may be miniaturized to a level that display assembly 802 may include its own battery and wireless video reception capabilities. In such embodiments, video may be transmitted directly from targeting device 402 of FIG. 4 to viewing assembly 800 without the need of receiver 700.

Because display assembly 802 may be mounted to an array of user glasses 804, there is a need to provide a means to adjust the location and plane of video display 810 relative to a user's eye. In some embodiments, mounting frame 812 includes adjusting arms 814 that work in conjunction with attachment hardware 818 to alter the viewing angle of video display 810.

For example, in one embodiment, turning adjuster arm 814 in a clockwise rotation relative to the end farther from the user glasses 804 will cause that corner of mounting frame 812 to increase in distance from the lens of user glasses 804 resulting in a slight upward tilt of the same upper-right corner of the video display 810. Similarly, rotating the adjuster arm 816 in a counter clockwise rotation would cause the lower-right portion of frame 812 to decrease in distance from the lens of user glasses 804 again resulting in an upward tilt of video display 810. Various configurations of adjusting arms may be utilized depending on the embodiment. For instance, one embodiment might utilize two adjuster arms in the upper corners of a mounting frame, while another may use two and the bottom and one at the top. In some embodiments, an adjuster arm may be located at each of the four corners of mounting frame 812 to enable an increased degree of adjusting as well as providing four points of contact against the user eyeglasses 804.

Finally, mounting hardware 818 allows mounting frame 812 to be securely attached to eyeglasses 804. By utilizing mounting hardware 818 that attaches to the inside of the frame portion of user glasses 804, the adjusting arms 814 and 816 of mounting frame 812 have suitable resistance against which to adjust. Thus, mounting hardware 818 should be comprised of a material that allows for suitable resistance against the adjuster arms while still being ductile enough to allow for necessary adjustments.

In some embodiments, attachment hardware 818 may be configured to "hook" or otherwise attach to the upper and lower portions of the user eyeglass 804. Such a configuration would allow a minimal amount of obstruction between the user's eye and the video display 810.

In other embodiments, a continuous band (e.g., a rubber band) may be used as the mounting hardware 818. In such configurations, one or more transparent or translucent attachment bands (e.g., rubber bands, plastic straps, or another suitable ductile material) serve to secure the monocular display frame to the front of the glasses and improve support to keep the display static to the glasses. A continuous band may be preferable in situations where absolute mounting security is desirable or in a situation where user glasses 804 lack a suitable interior lip to allow a hook configuration to be successful. Additionally, a continuous loop also allows the display assembly 802 and mounting assembly to be used across multiple different user glasses without adaptation.

In other embodiments, display assembly 802 may be mounted to user eyeglasses 800 by another means such as by suction mounting cups located at each corner of the display housing 806. By applying pressure to the display housing 806 with one or more suction mounting cups in contact with any user eyeglass 800 lens, display assembly 802 can be mounted in a manner that places video display 810 within the line of site of one eye of the user.

Figure 8B:
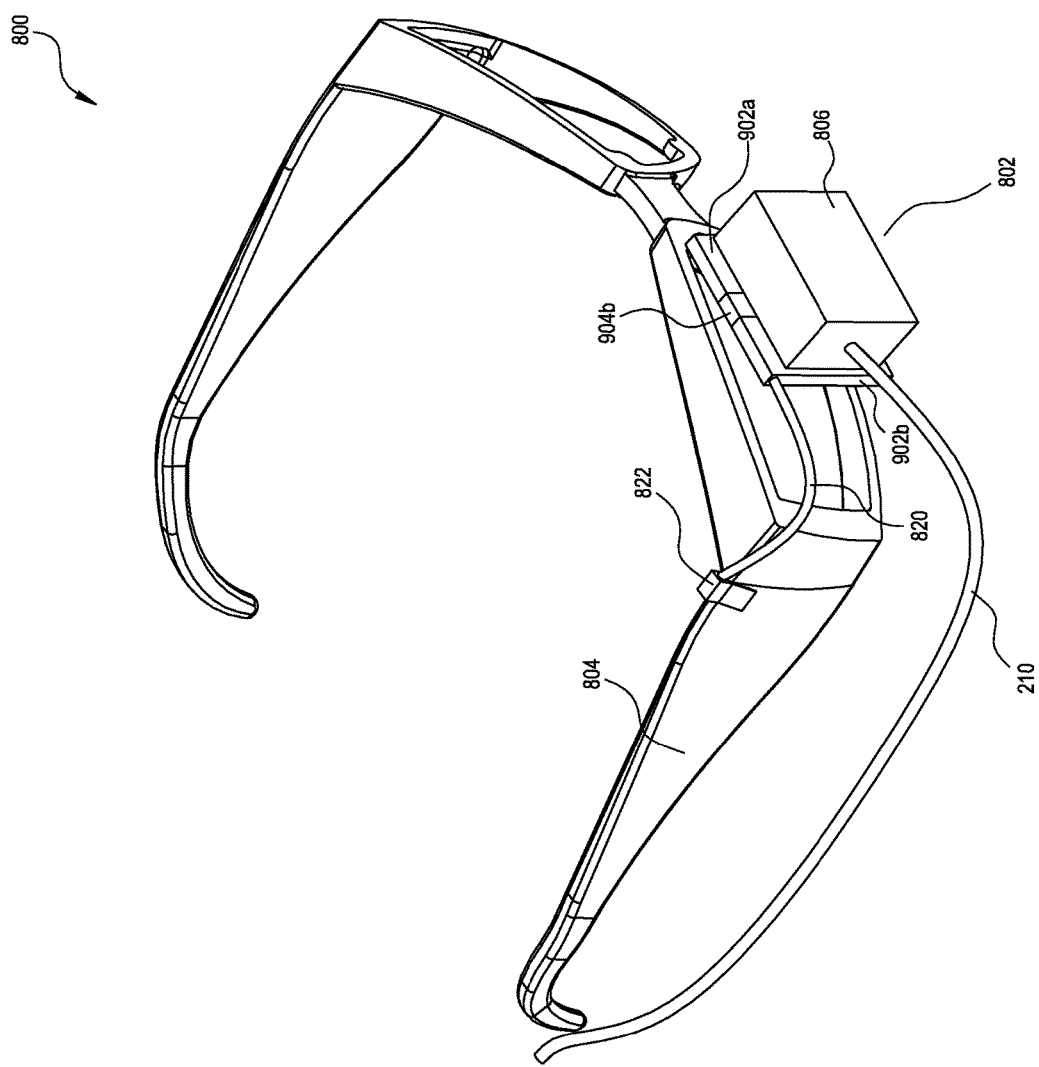
FIG. 8B is an illustration of a display assembly portion of a targeting system with an alternative mounting structure, according to an embodiment.

In the embodiment shown in FIG. 8B, display assembly 802 may be attached to arm 804 of a user's glasses by means of semi-rigid arm 820. At the connection end of arm 820 is an attachment means 822 such as a spring clip. Attachment means 822 can be manipulated by a user to clip or otherwise secure one end of arm 820 to the glasses. The opposite end of arm 820 is then secured to the mounting frame at, for instance, frame rail 902*b*. Additionally, because arm 820 is only semi-rigid, a user may flex, bend, or otherwise reshape the arm in order to adjust the location of visual assembly 802 relative to the user's eye.

In some embodiments, multiple semi-rigid arms and attachment means, such as those illustrated as arm 820 and attachment means 822 may be utilized. In such embodiments, multiple points of connection may be made between display assembly 802 and user glasses. In other embodiments, some attachment point may be permanent or semi-permanent, while others are designed to be rapidly detached. For instance, display assembly 802 may include two attachment means that attach to the top of the frame of the user glasses in a semi-permanent manner. An additional arm 820 and attachment means 822 may connect to the bottom of the lens in an easily detachable configuration. Such an embodiment would allow a user to "flip" the display assembly 802 out of the way by detaching the lower attachment means and pivoting the display assembly 802 up by utilizing the semi-permanent attachment points. Such flip away embodiments may be achieved using other configurations of selectively removable attachment points.

Semi-rigid arm 820 may be composed of a ductile or malleable material such as copper, a metal alloy, plastic, or other semi-rigid adjustable material known in the art. Attachment means 822, likewise, may be composed of any number of materials and configurations such that it may attach securely to a user worn device such as eye glasses with enough strength to support the weight of visual display 802 and accommodate stresses associated with adjusting the visual display 802.

User eyeglasses 804 may also include a protective exoskeleton that is mounted or removably attached. This protective exoskeleton can be fabricated from a polymer, metals, ceramics, composites, alloys, aluminum, carbon fibers, and combinations therefore, or other materials that provide wear resistance and impact protection to the eyeglasses.

In some configurations, the monocular display frame may include fixed, substantially inflexible attachment points that are designed to be compatible with one or more specific eyeglass frame. While such a configuration may reduce the total number of eyeglass frames the display may be compatible with, it may increase the adjustability and security of the monocular display on compatible frames. Further, in such embodiments, the frame may be detachable from the monocular display allowing a user to switch frames if or when they switch eyeglasses. In this manner, a user has the option to utilize a universal attachment mechanism (e.g., using ductile straps) or a more customized attachment mechanism (e.g., monocular frame with compatible substantially inflexible attachment points.) In some embodiments, the monocular display assembly may include a variety of different mounting frames designed to support a variety of eyeglass frames allowing a user to select their preferred mounting configuration.

Figure 9:
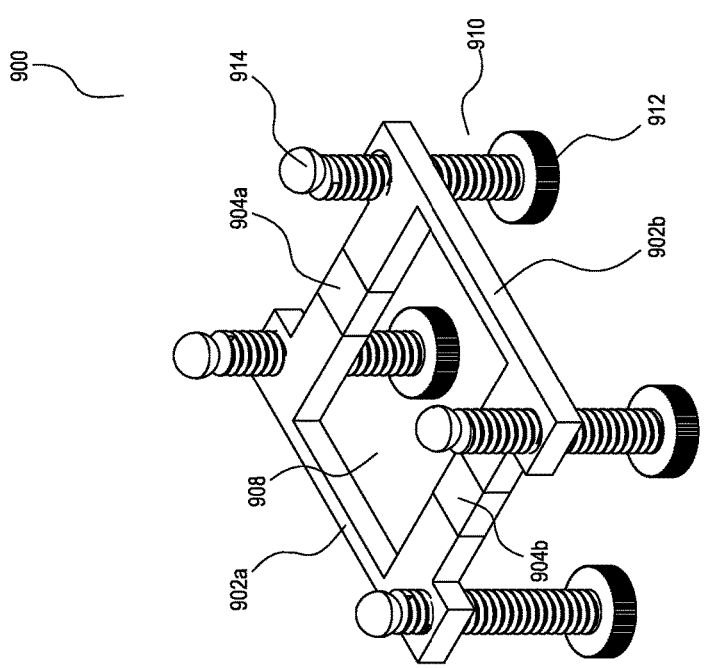
FIG. 9 is an illustration of a display mounting frame of a user viewing assembly portion of a targeting system, according to an embodiment.

A more detailed version of the mounting frame 812 and associated adjusting arms 814 and 816 are shown in FIG. 9. Video display mounting frame 900 includes frame rails 902*a* and 902*b*, biasing joints 904*a* and 904*b*, cavity 908, and adjuster arm 910. Adjust arm 910 further includes adjuster head 912 and contact point 914.

In order to properly secure a video display housing such as display housing 806 of FIG. 8A, mounting frame 900 is capable of temporarily expanding to insert a compatible display housing and then returning to its original size thereby locking the display housing in place.

For instance, in embodiment 900, cavity 908 can be enlarged by manipulating frame rail 902*a* away from frame rail 902*b*. This is possible because biasing joints 904*a* and 904*b* connect the two rails, but do so with a particular level of ductility. Once the force manipulating the rails apart is removed, biasing joints 904a and 904b return to their original unbiased position. This allows a video display housing to be inserted while in the biased position and then secured when in the unbiased position.

Once a video housing is installed within mounting frame 900, the one or more adjuster arms 910 may be used to adjust the plane of the video display as described in conjunction with FIG. 8A.

The present invention may be embodied in other specific forms without departing from its spirit or essential characteristics. The described embodiments are to be considered in all respects only as illustrative and not restrictive. The scope of the invention, therefore, is indicated by the appended claims rather than by the foregoing description. All changes, which come within the meaning and range of equivalency of the claims, are to be embraced within their scope.

What is claimed is:

1. A targeting system for visualizing a target, the targeting system comprising: a targeting assembly comprising a main body mountable to a weapon having a rail mount and an adjustable attachment rail selectively mountable to the main body, the main body supporting a visual assembly, a first power assembly, and a transmission assembly, wherein the adjustable attachment rail is movable towards or away from the main body to form a variable width profile being inverse of a profile of the rail mount, and wherein the width of the variable width profile corresponds to a width of the rail mount profile; and a viewing assembly in communication with the targeting assembly, the viewing assembly comprising a receiver assembly, a second power assembly, and a display assembly removably mounted to eye spectacles, the second power assembly being separate from the first power assembly.

2. The targeting system of claim 1, wherein the transmission assembly is configured to transmit a video stream over a wireless connection to the receiver assembly.

3. The targeting system of claim 2, wherein the receiver assembly, in response to receiving a video stream from the targeting assembly, transmits the video stream to the viewing assembly.

4. The targeting system of claim 1, wherein the adjustable attachment rail and a portion of the main body form a profile complementary to a rail mount of a weapon to which the targeting assembly mounts.

5. The targeting system of claim 4, wherein the main body includes a first profile extending in a first direction and the adjustable attachment rail includes a second profile extending the first direction, the first profile and the second profile being inverse of a profile of the rail mount.

6. A targeting system of claim 1, wherein the display assembly further comprise a removable or rechargeable power supply.

7. The targeting system of claim 1, wherein the main body includes an exoskeleton.

8. The targeting system of claim 1, wherein the main body comprises a power controller.

9. A method for aiming a weapon having a rail mount, the method comprising: mounting a targeting assembly to the rail mount, wherein mounting the targeting assembly to the rail mount includes: securing an adjustment rail to a main body of the targeting assembly to form a variable width profile, the variable width profile being inverse of a profile of the rail mount; adjusting a width of the variable width profile by moving the adjustment rail towards or away from the main body so that the width of the variable width profile corresponds to a width of the rail mount profile; and securing the variable width profile of the targeting assembly around the rail mount profile; mounting a viewing assembly with a video display on a lens of eye spectacles having a second field of view, the second field of view remaining at least partially unobstructed when the viewing assembly is mounted on the lens; capturing video stream data within a first field of view of the targeting assembly; and transmitting the video stream data from the targeting assembly to the viewing assembly; and displaying the video stream data on the video display removably attached to the lens of eye spectacles.

10. The method of claim 9, wherein mounting the viewing assembly with a video display on the lens of eye spectacles further comprises mounting the viewing assembly using a semi-rigid arm, the arm being mounted to the viewing assembly at a first end of the arm and mounted to the eye spectacles on a second end of the arm.

11. The method of claim 9, further comprising mounting a receiver assembly to the eye spectacles.

12. The method of claim 11, further comprising electrically connecting the receiver assembly to the video display by a video transmission cable.

13. A method for aiming a weapon having a rail mount, the method comprising: mounting a targeting assembly to the weapon, the targeting assembly comprising at least a visual assembly having a first field of view, wherein mounting the targeting assembly includes: securing an adjustment rail to a main body of the targeting assembly to form a variable width profile, the variable width profile being inverse of a profile of the rail mount; and adjusting a width of the variable width profile by moving the adjustment rail towards or away from the main body so that the width of the variable width profile corresponds to a width of the rail mount profile; positioning a viewing portal within a second field of view so that the second field of view remains at least partially unobstructed; connecting the targeting assembly to the viewing portal; drawing the weapon, wherein drawing the weapon activates the targeting assembly and the viewing portal; transmitting video data stream data from the targeting assembly to the viewing portal; and displaying the video data stream to the user through the viewing portal.

14. The method of claim 1, wherein mounting the targeting assembly further comprises mounting a main body to a structure specific mount.

15. The method of claim 13, wherein mounting the targeting assembly further comprise mounting a main body to one of an accessory rail mount, a scope mount, a barrel mount, and a drone mount.

16. The method of claim 13, wherein mounting the viewing portal comprises mounting a video display on eye spectacles worn by a user.

17. The method of claim 16, further comprising mounting a receiver assembly on the eye spectacles worn by the user.

18. The method of claim 17, further comprising electrically connecting the receiver assembly and the viewing portal.

19. The method of claim 13, wherein the mounting of the targeting assembly to a weapon includes mounting a main body of the targeting assembly to a fire arm with a rail assembly, the main body including at least a visual assembly;

an act of mounting a viewing portal, including at least a video display, on eye spectacles worn by a user, wherein the displaying of the video stream to the user through the viewing portal includes displaying the video on the visual display;

an act of transmitting video data stream data from the targeting assembly to the viewing portal via BLUETOOTH; and an act of displaying the video data stream to the user through the video display removably attached to the user's eye spectacles.

\* \* \* \* \*